United States Patent
Guo et al.

(10) Patent No.: US 11,693,601 B2
(45) Date of Patent: *Jul. 4, 2023

(54) ENABLING VIRTUAL FUNCTIONS ON STORAGE MEDIA

(71) Applicant: Marvell Asia Pte, Ltd., Singapore (SG)

(72) Inventors: Liping Guo, Palo Alto, CA (US); Yingdong Li, San Francisco, CA (US); Scott Furey, Cupertino, CA (US); Salil Suri, Fremont, CA (US)

(73) Assignee: Marvell ASIA PTE, LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,115

(22) Filed: Jun. 27, 2022

(65) Prior Publication Data
US 2022/0334770 A1    Oct. 20, 2022

Related U.S. Application Data

(63) Continuation of application No. 16/533,376, filed on Aug. 6, 2019, now Pat. No. 11,372,580.
(Continued)

(51) Int. Cl.
G06F 9/455    (2018.01)
G06F 3/06     (2006.01)
G06F 13/42    (2006.01)

(52) U.S. Cl.
CPC .......... G06F 3/0659 (2013.01); G06F 3/061 (2013.01); G06F 3/0655 (2013.01);
(Continued)

(58) Field of Classification Search
None
See application file for complete search history.

(56) References Cited

U.S. PATENT DOCUMENTS

| 6,671,791 | B1 | 12/2003 | McGrath | |
| 8,504,780 | B2 * | 8/2013 | Mine | G06F 9/544 |
| | | | | 710/48 |

(Continued)

FOREIGN PATENT DOCUMENTS

| CN | 1708742 | 12/2005 |
| CN | 106487719 | 3/2017 |

(Continued)

OTHER PUBLICATIONS

Guan et al.; "SR-IOV Based Network Interrupt-Free Virtualization with Event Based Polling"; IEEE 2013; (Guan_2013.pdf; pp. 2596-2609) (Year: 2013).*

(Continued)

*Primary Examiner* — Hiren P Patel
(74) *Attorney, Agent, or Firm* — Colby Nipper PLLC

(57) ABSTRACT

The present disclosure describes apparatuses and methods for automatically mapping virtual functions to storage media to enable single root input output virtualization. A storage media switch manages access to virtual functions that execute behind a storage media interface managed by the switch. The switch includes a host interface through which the switch receives host commands. The switch determines virtual function identifiers associated with the host commands and automatically selects the virtual functions of the storage media based on the virtual function identifiers. The switch executes the host commands over the storage media interface using the virtual functions, and after execution, responds via the host interface to each of the host commands. By automatically mapping virtual functions in this way, the switch automatically enables single root input output virtualization of storage media, including storage media that is without native support for input output virtualization.

20 Claims, 14 Drawing Sheets

Related U.S. Application Data

(60) Provisional application No. 62/716,278, filed on Aug. 8, 2018, provisional application No. 62/715,706, filed on Aug. 7, 2018.

(52) U.S. Cl.
CPC ........ *G06F 3/0679* (2013.01); *G06F 9/45558* (2013.01); *G06F 13/4221* (2013.01); *G06F 2009/45583* (2013.01); *G06F 2213/0026* (2013.01)

(56) References Cited

U.S. PATENT DOCUMENTS

| | | | |
|---|---|---|---|
| 8,751,713 B2* | 6/2014 | Ayzenfeld | G06F 13/20 710/104 |
| 9,015,351 B1 | 4/2015 | Geddes et al. | |
| 9,378,049 B1* | 6/2016 | Johnson | G06F 9/45558 |
| 9,734,096 B2* | 8/2017 | Lee | G06F 13/105 |
| 9,747,039 B1 | 8/2017 | Coleman et al. | |
| 10,228,874 B2 | 3/2019 | Wysocki et al. | |
| 10,318,324 B2* | 6/2019 | Carson | G06F 9/45533 |
| 10,860,213 B2* | 12/2020 | Singh | G06F 3/061 |
| 10,901,910 B2* | 1/2021 | Raisch | G06F 3/0673 |
| 10,956,346 B1 | 3/2021 | Ben-Yehuda et al. | |
| 10,963,393 B1 | 3/2021 | Ben-Yehuda et al. | |
| 11,010,314 B2 | 5/2021 | Therene et al. | |
| 11,055,232 B2 | 7/2021 | Keppel et al. | |
| 11,074,013 B2* | 7/2021 | Suri | G06F 3/0607 |
| 11,256,431 B1 | 2/2022 | Ben-Yehuda et al. | |
| 11,372,580 B2 | 6/2022 | Guo et al. | |
| 11,372,586 B2* | 6/2022 | L'Ecuyer | G06F 3/0679 |
| 11,467,991 B2 | 10/2022 | Therene et al. | |
| 11,481,118 B2 | 10/2022 | Klein et al. | |
| 2005/0182948 A1 | 8/2005 | Ducharme | |
| 2007/0260825 A1 | 11/2007 | Yudenfriend et al. | |
| 2008/0100636 A1 | 5/2008 | Lai et al. | |
| 2008/0177974 A1 | 7/2008 | Chiang et al. | |
| 2008/0182948 A1 | 7/2008 | Xiaoming et al. | |
| 2009/0077333 A1 | 3/2009 | Byrne et al. | |
| 2010/0169382 A1 | 7/2010 | Sheaffer et al. | |
| 2011/0154318 A1 | 6/2011 | Oshins et al. | |
| 2012/0010772 A1 | 1/2012 | Pack et al. | |
| 2012/0151178 A1 | 6/2012 | Brownlow et al. | |
| 2012/0183001 A1 | 7/2012 | Suzuki et al. | |
| 2012/0192178 A1 | 7/2012 | Brownlow et al. | |
| 2012/0254464 A1 | 10/2012 | Armstrong et al. | |
| 2013/0145231 A1 | 6/2013 | Frayer et al. | |
| 2013/0179877 A1 | 7/2013 | Dain | |
| 2013/0254146 A1 | 9/2013 | Ellis et al. | |
| 2014/0089233 A1 | 3/2014 | Ellis et al. | |
| 2014/0096132 A1 | 4/2014 | Wang et al. | |
| 2014/0143558 A1 | 5/2014 | Kuesel | |
| 2014/0281106 A1 | 9/2014 | Saghi et al. | |
| 2015/0317088 A1 | 11/2015 | Hussain et al. | |
| 2015/0378884 A1 | 12/2015 | Nemazie et al. | |
| 2016/0224248 A1 | 8/2016 | Choi et al. | |
| 2016/0267016 A1 | 9/2016 | Lee et al. | |
| 2016/0292007 A1 | 10/2016 | Ding et al. | |
| 2016/0371014 A1 | 12/2016 | Roberts | |
| 2017/0024132 A1 | 1/2017 | Jun et al. | |
| 2017/0031816 A1 | 2/2017 | Lee et al. | |
| 2017/0032245 A1 | 2/2017 | Osband et al. | |
| 2017/0070241 A1 | 3/2017 | Kaku et al. | |
| 2017/0123901 A1 | 5/2017 | Zhao et al. | |
| 2017/0124463 A1 | 5/2017 | Chen et al. | |
| 2017/0149733 A1 | 5/2017 | Chastain et al. | |
| 2017/0220410 A1 | 8/2017 | Kim et al. | |
| 2017/0235510 A1 | 8/2017 | Hu et al. | |
| 2017/0269876 A1 | 9/2017 | Mukhopadhyay et al. | |
| 2017/0277573 A1 | 9/2017 | Huynh | |
| 2018/0032249 A1 | 2/2018 | Makhervaks et al. | |
| 2018/0088804 A1 | 3/2018 | Mummidi et al. | |
| 2018/0181302 A1 | 6/2018 | Liu | |
| 2018/0210754 A1 | 7/2018 | Vaish et al. | |
| 2018/0217951 A1 | 8/2018 | Benisty et al. | |
| 2018/0307622 A1 | 10/2018 | Smith et al. | |
| 2018/0373450 A1 | 12/2018 | Ji et al. | |
| 2019/0042799 A1 | 2/2019 | Durham et al. | |
| 2019/0050295 A1 | 2/2019 | Ding et al. | |
| 2019/0129656 A1 | 5/2019 | Bains et al. | |
| 2019/0146823 A1 | 5/2019 | Rewaskar et al. | |
| 2019/0266117 A1 | 8/2019 | Duncan et al. | |
| 2019/0278620 A1 | 9/2019 | Korbar et al. | |
| 2019/0354599 A1 | 11/2019 | Mital et al. | |
| 2020/0004701 A1 | 1/2020 | Subbarao et al. | |
| 2020/0042341 A1 | 2/2020 | Gupta et al. | |
| 2020/0050385 A1 | 2/2020 | Furey et al. | |
| 2020/0050403 A1 | 2/2020 | Suri et al. | |
| 2020/0050470 A1 | 2/2020 | Guo et al. | |
| 2020/0104056 A1 | 4/2020 | Benisty et al. | |
| 2020/0133898 A1 | 4/2020 | Therene et al. | |
| 2020/0225851 A1 | 7/2020 | Klein et al. | |
| 2020/0278799 A1* | 9/2020 | Kumar | G06F 3/0673 |
| 2020/0286562 A1 | 9/2020 | Gorobets et al. | |
| 2020/0310997 A1 | 10/2020 | Chen et al. | |
| 2020/0371954 A1 | 11/2020 | Li et al. | |
| 2021/0271611 A1 | 9/2021 | Therene et al. | |
| 2023/0019264 A1 | 1/2023 | Therene et al. | |
| 2023/0045617 A1 | 2/2023 | Narasimma Moorthy et al. | |

FOREIGN PATENT DOCUMENTS

| | | |
|---|---|---|
| JP | 2009251751 | 10/2009 |
| TW | 201640358 | 11/2016 |
| WO | 2020089759 | 5/2020 |

OTHER PUBLICATIONS

"Foreign Office Action", CN Application No. 201910727158.1, dated Jul. 22, 2022, 15 pages.
"Foreign Office Action", EP Application No. 19797810.9, dated Aug. 18, 2022, 10 pages.
"Notice of Allowance", U.S. Appl. No. 16/737,137, dated Jul. 28, 2022, 8 pages.
"EP Search Report", EP Application No. 19190610.6, dated Dec. 20, 2019, 11 pages.
"Extended European Search Report", EP Application No. 19190611.4, dated Jan. 8, 2020, 12 pages.
"Extended European Search Report", EP Application No. 20151268.8, dated May 18, 2020, 7 pages.
"Foreign Office Action", EP Application No. 19190606.4, dated Apr. 21, 2022, 8 pages.
"Foreign Office Action", EP Application No. 19190610.6, dated Sep. 7, 2021, 8 pages.
"Foreign Office Action", EP Application No. 19190606.4, dated Jan. 28, 2021, 6 pages.
"Foreign Office Action", EP Application No. 19190611.4, dated Dec. 10, 2021, 8 pages.
"International Preliminary Report on Patentability", Application No. PCT/IB2019/059194, dated Apr. 27, 2021, 9 pages.
"International Search Report and Written Opinion", Application No. PCT/IB2019/059194, dated Jan. 22, 2020, 14 pages.
"Non-Final Office Action", U.S. Appl. No. 16/737,137, dated Apr. 25, 2022, 10 pages.
"Non-Final Office Action", U.S. Appl. No. 16/533,243, dated Jun. 21, 2022, 8 pages.
"Non-Final Office Action", U.S. Appl. No. 16/664,528, dated Sep. 18, 2020, 11 Pages.
"Non-Final Office Action", U.S. Appl. No. 16/533,376, dated Oct. 4, 2021, 29 pages.
"Non-Final Office Action", U.S. Appl. No. 16/533,399, dated Dec. 10, 2020, 20 pages.
"Notice of Allowance", U.S. Appl. No. 16/664,528, dated Jan. 6, 2021, 9 pages.
"Notice of Allowance", U.S. Appl. No. 16/533,376, dated Feb. 24, 2022, 9 pages.
"Notice of Allowance", U.S. Appl. No. 16/533,399, dated Mar. 23, 2021, 8 pages.

(56) References Cited

OTHER PUBLICATIONS

"Notice of Allowance", U.S. Appl. No. 17/320,096, dated May 17, 2022, 12 pages.
Dunlap, "The Intel Sysret Privilege Escalation", XenProject, Jun. 13, 2012, 7 pages.
Wang, et al., "SWANS: An Interdisk Wear-Leveling Strategy for RAID-0 Structured SSD Arrays", ACM Transactions an Storage, vol. 12, No. 3, Article 10, Apr. 2016, 22 pages.
"Notice of Allowance", U.S. Appl. No. 16/533,243, dated Jan. 5, 2023, 7 pages.
"Foreign Office Action", CN Application No. 201910727158.1, dated Mar. 21, 2023, 15 pages.
"Notice of Allowance", U.S. Appl. No. 17/935,364, dated Mar. 29, 2023, 10 pages.

\* cited by examiner

ENABLING VIRTUAL FUNCTIONS ON STORAGE MEDIA

CROSS REFERENCE TO RELATED APPLICATION

This present disclosure is a continuation of and claims priority to U.S. Non-Provisional patent application Ser. No. 16/533,376, filed on Aug. 6, 2019, which in turn claims priority to U.S. Provisional Patent Application Ser. No. 62/715,706, filed on Aug. 7, 2018, and U.S. Provisional Patent Application Ser. No. 62/716,278, filed on Aug. 8, 2018, the disclosures of which are incorporated by reference herein in their entireties.

BACKGROUND

Typically, a large-scale data compute system is implemented with arrays of hard-disk devices, solid-state memory devices, and other types of storage devices or combinations thereof. To simplify management, lower cost, and improve performance, some large-scale data compute systems enable Single Root Input Output Virtualization (SR-IOV). A large-scale data compute system may grow over time to have multiple generations and types of storage devices including, SR-IOV capable storage devices and storage devices that do not natively support SR-IOV. As a result, some parts of a large-scale data compute system may be inefficient as no common implementation of hardware enabled storage virtualization can be utilized.

SUMMARY

This summary is provided to introduce subject matter that is further described in the Detailed Description and Drawings. Accordingly, this Summary should not be considered to describe essential features nor used to limit the scope of the claimed subject matter.

In some aspects, a storage media switch implements a method for supporting virtual functions on storage media. The switch implements the method by receiving, via a host interface, a host command from a host, and responsive to receiving the host command, determining a virtual function identifier associated with the host command. The switch furthers the method by selecting, based on the virtual function identifier, a virtual function of the storage media for executing the host command. Responsive to executing the host command using the virtual function assigned to the storage media, the switch continues the method by responding, via the host interface, to the host command. By implementing the method to automatically enable support for virtual functions in this way, the switch may automatically (e.g., without host involvement) enable support for virtual functions on a variety of storage media types, including storage media that is without native virtual function support. Automatically supporting virtual functions provides more isolation and partitioning functionalities to applications or services executing at a host, without requiring involvement or use of host computing resources.

In other aspects, an apparatus comprises a hardware-based processor, a memory coupled to the processor and configured to maintain processor-executable instructions that, responsive to execution, implement an application on the apparatus, and a host interface configured to enable the application to act as a host to access data in storage media associated with the apparatus. A storage media switch of the apparatus is coupled to the host interface and provides a storage media interface. The storage media switch is configured to: receive, via the host interface, a host command from the application acting as a host; responsive to receiving the host command, determine a virtual function identifier associated with the host command, and select, based on the virtual function identifier, a virtual function of the storage media for executing the host command. Responsive to executing the host command over the storage media interface and using the virtual function assigned to the storage media, the storage media switch is configured to respond, via the host interface, to the host command.

In yet other aspects, a System-on-Chip (SoC) is described that includes a storage media interface to storage media, a host interface to a host, a hardware-based processor, and a memory configured to store processor-executable instructions. Responsive to execution by the hardware-based processor, the processor-executable instructions implement a storage media switch to: receive, via the host interface, a host command from the host, responsive to receiving the host command, determine a virtual function identifier associated with the host command, and select, based on the virtual function identifier, a virtual function of the storage media for executing the host command. Further, responsive to execution by the hardware-based processor, the processor-executable instructions implement the storage media switch to respond, via the host interface, to the host command in response to executing the host command over the storage media interface and using the virtual function assigned to the storage media.

The details of one or more implementations are set forth in the accompanying drawings and the following description. Other features and advantages will be apparent from the description and drawings, and from the claims.

BRIEF DESCRIPTION OF THE DRAWINGS

The details of one or more implementations of enabling virtual function support on storage media are set forth in the accompanying figures and the detailed description below. In the figures, the left-most digit of a reference number identifies the figure in which the reference number first appears. The use of the same reference numbers in different instances in the description and the figures indicates like elements.

DETAILED DESCRIPTION

Figure 1:
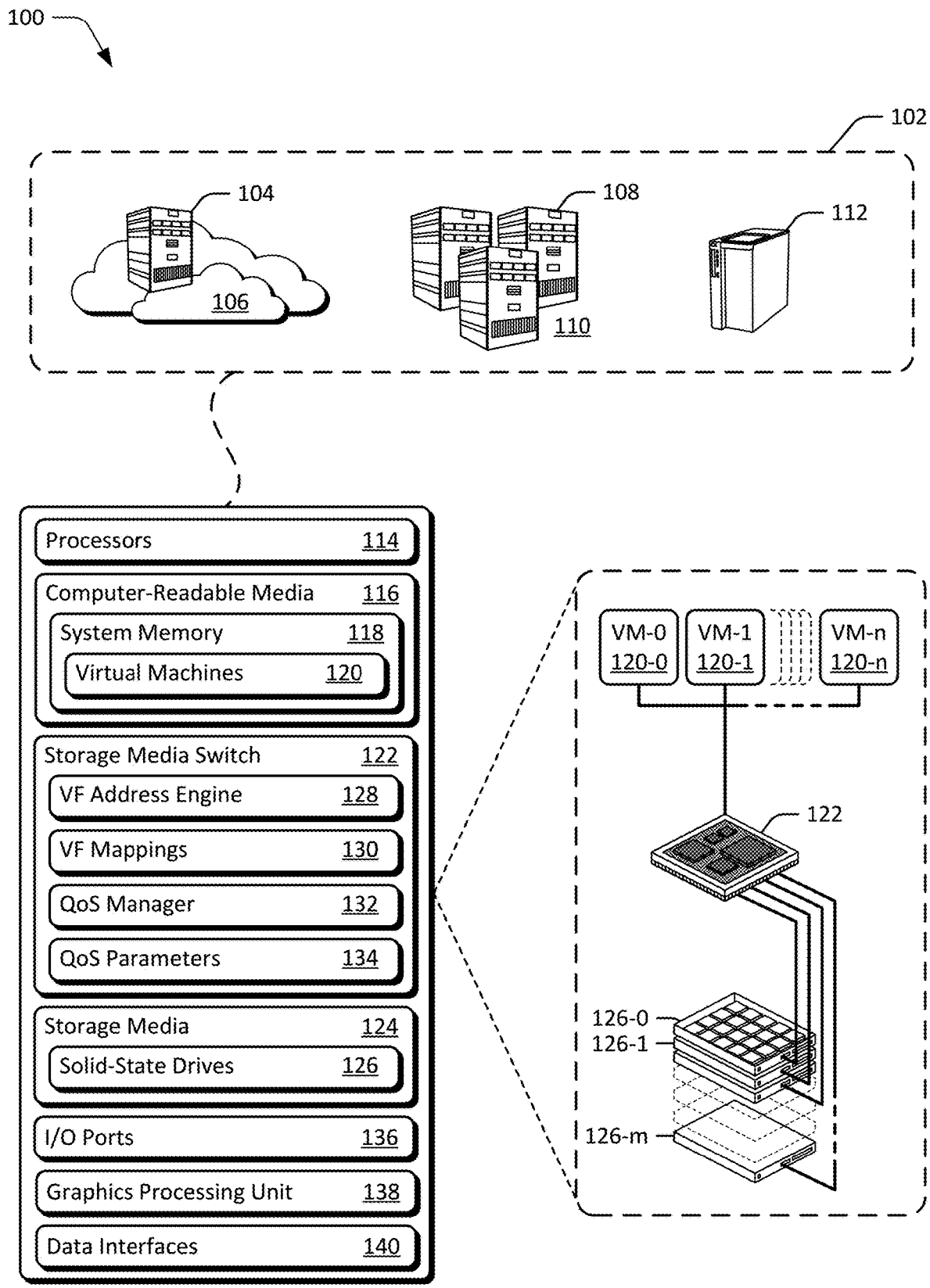
FIG. 1 illustrates an example operating environment having devices enabling virtual function support on storage media in accordance with one or more aspects of this disclosure.

In a large-scale data compute system, SR-IOV may be used to manage physical storage devices as one or more virtual functions by abstracting upper layer protocols from physical connections. Through SR-IOV a host may command a virtual function without regard to how the virtual function is implemented. As such, SR-IOV may cause a single storage device to be divided in many different ways to appear as multiple virtual functions. SR-IOV may combine multiple storage devices in many different ways to appear as a single virtual function or multiple virtual functions.

Large-scale data compute systems may be implemented with arrays of storage devices that support SR-IOV and storage devices that do not support SR-IOV. Portions of storage media that do not support SR-IOV may be unavailable to hosts of the data compute system that require virtual functions.

A storage media switch is described that enables hosts to fully utilize virtual functions and SR-IOV capability using any part of a data compute system, including using storage devices that are not inherently SR-IOV capable. On behalf of the data compute system, the storage media switch responds to host commands sent to the data compute system over a standard, high-speed serial computer expansion bus interface, such as Peripheral Component Interface Express (PCIe®). By managing communication sent between the data compute system and the host, the storage media switch may direct the data compute system to provide SR-IOV functionality, including on storage devices that do not natively support SR-IOV.

When enabling virtual functionality on storage devices that are not inherently SR-IOV capable, the storage media switch automatically maps virtual functions through a virtual address windowing scheme built inside the storage media switch. Applying the virtual address windowing scheme to a host command enables the storage media switch to track the host command through the processing pipeline to enable the switch to subsequently respond to the proper host.

The scheme requires the switch to track each host command with a corresponding virtual function identifier. Each unique virtual function identifier corresponds to a different virtual function. A host may designate a virtual function for a host command by including the virtual function identifier in a virtual address field of the host command. For an untagged command received from a host, the switch may tag or encode the host command by automatically encoding a virtual address field of the host command with a virtual function identifier.

The portion (e.g., bits) of the virtual address field used to hold the virtual function identifier may be arbitrarily chosen either from a sign-extended canonical address portion or any unused portion of the virtual address. Internally, the switch utilizes these tagged address portions or bits to route the host initiated read/write transactions in response to the original host command and alto to route those transactions back to the host upon completion.

A virtual address field of a host command may include additional capacity (e.g., bytes, bits) beyond what is necessary to designate a virtual function address. This additional capacity may normally be unused. For example, a virtual address field of a host command may include bits of information that are not checked or used by the host or the storage media switch. The unused address portion of the virtual address field may instead include redundant bits of information, e.g., a sign-extended canonical portion of the virtual address contained within the host command, that if omitted or incorrect, may not affect the host or the storage media switch. The switch may require the unused portion of the virtual address field to include an indication of a virtual function identifier.

A host or the switch may add the virtual function identifier to each host command. The host may tag or encode a virtual function identifier into each host command's virtual address, including the command embedded physical region pages (PRP) list, before outputting the host command to the host interface of the storage media switch. Alternatively, after receiving a host command at the host interface of the switch, the storage media switch may tag or encode each host command's virtual address with the virtual function identifier, including the command PRP list.

During execution of the host command, the switch determines the virtual function identifier encoded in the host command and initiates read or write transactions to and from the host memory using the virtual function corresponding to the determined virtual function identifier. The switch may remove the virtual function identifier tagged to the virtual address of the host command when responding to the host command. The switch may restore the normally unused portion of the virtual address of the host command (e.g., the sign-extended canonical portion of the virtual address) to a predefined state before acknowledging the host command as having been completed. For instance, the switch may determine an "untagged" original address associated with a host command by removing the virtual function identifier from the virtual address contained within the host command and by responding to the host command by including the original address and not including the virtual function identifier (e.g., for host memory access).

When enabling virtual functionality on storage devices already inherently SR-IOV capable, the storage media switch may choose to bind frontend virtual functions to virtual functions of backend storage media devices. For example, the switch may automatically map virtual functions to corresponding storage media devices by matching drive request identifiers of storage media connected to a storage media interface of the switch, and also to the virtual functions specified in the host commands. In this way, virtual function identifiers do not need to be tagged or encoded in the host command to initiate read/write transactions from/to the host memory. Rather, virtual functions may be mapped automatically with the host specifying the virtual function using the built-in drive request identifier.

In various aspects of automatically mapping virtual functions to storage media to enable single root input output virtualization, a storage media switch manages access to virtual functions that execute behind a storage media interface of the switch. The switch also includes a host interface from which the switch exchanges information, including host commands, with a host. The switch determines virtual function identifiers associated with the host commands and automatically selects the virtual functions of the storage media based on the virtual function identifiers. Alternatively, the switch selects the virtual functions of the storage media based on the virtual functions specified in the host commands, e.g., by matching the virtual functions to drive request identifiers of storage media connected to a storage media interface of the switch.

The switch executes the host commands over the storage media interface using the virtual functions, and after execution, responds via the host interface to each of the host commands. By automatically mapping virtual functions in this way, the switch enables single root input output virtualization on any storage media, including storage media that is without native support for virtual functions.

The following discussion describes an operating environment, techniques that may be employed in the operating environment, and a System-on-Chip (SoC) in which components of the operating environment may be embodied. In the context of the present disclosure, reference is made to the operating environment by way of example only.

Operating Environment

FIG. 1 illustrates an example operating environment 100 having host devices 102 (referred to simply as a single "host device 102") in which virtual function support or QoS over a virtual interface may be implemented in accordance with one or more aspects. The host device 102 of the operating environment 100 is capable of storing or accessing various forms of data, files, objects, or information. Examples of the host device 102 may include a computing cluster 104 (e.g., of a cloud 106), a server 108 or server hardware of a data center 110, or a server 112 (e.g., standalone), any of which may be configured as part of a storage network, storage service, or cloud system. Further examples of the host devices 102 (not shown) may include a tablet computer, a set-top-box, a data storage appliance, wearable smart-device, television, content-streaming device, high-definition multimedia interface (HDMI) media stick, smart appliance, home automation controller, smart thermostat, Internet-of-Things (IoT) device, mobile-internet device (MID), a network-attached-storage (NAS) drive, aggregate storage system, server blade, gaming console, automotive entertainment device, automotive computing system, automotive control module (e.g., engine or power train control module), and so on. Generally, the host device 102 may communicate or store data for any suitable purpose, such as to enable functionalities of a particular type of device, provide a user interface, enable network access, implement gaming applications, playback media, provide navigation, edit content, provide data storage, or the like.

The host device 102 includes processors 114 and computer-readable storage media 116. The processors 114 may be implemented as any suitable type or number of processors (e.g., x86 or ARM), either single-core or multi-core, for executing instructions or commands of an operating system or other programs of the host device 102. The computer-readable media 116 (CRM 116) includes system memory 118 from which virtual machines 120 of a host may be executed or implemented. The system memory 118 of the host device 102 may include any suitable type or combination of volatile memory or nonvolatile memory. For example, the volatile memory of host devices 102 may include various types of random-access memory (RAM), dynamic RAM (DRAM), static RAM (SRAM) or the like. The non-volatile memory may include read-only memory (ROM), electronically erasable programmable ROM (EEPROM) or Flash memory (e.g., NOR Flash or NAND Flash). These memories, individually or in combination, may store data associated with applications, tenants, workloads, initiators, virtual machines, and/or an operating system of the host device 102.

In this example, the host device 102 includes a storage media switch 122 and storage media 124, which may be accessed through the storage media switch 122. Although shown as being combined with the host device 102, the storage media switch 122 and/or the storage media 124 may be implemented separately from or remotely from the host device 102. The storage media 124 of the host device 102 may be configured as any suitable type of data storage media, such as a storage device, storage drive, storage array, storage volume, or the like. Although described with reference to the host device 102, the storage media 124 may also be implemented separately as a standalone device or as part of a larger storage collective, such as a data center, server farm, or virtualized storage system (e.g., for cloud-based storage or services). Examples of the storage media 124 include a hard-disk drive (HDD, not shown), an optical-disk drive (not shown), a solid-state drive 126 (SSD 126) or array of m+1 SSDs 126-0 through 126-m.

Each of the SSDs 126 includes or is formed from non-volatile memory devices on which data or information of the host device 102 or other sources is stored. The non-volatile memory devices may be implemented with any type or combination of solid-state memory media, such Flash, NAND Flash, NAND memory, RAM, DRAM (e.g., for caching), SRAM, or the like. In some cases, the data stored to the non-volatile memory devices may be organized into files of data (e.g., content) or data objects that are stored to the SSDs 126 and accessed by the host device 102 or tenants, workloads, or initiators of the host device. The types, sizes, or formats of the files may vary depending on a respective source, use, or application associated with the file. For example, the files stored to the SSDs 126 may include audio files, video files, text files, image files, multimedia files, spreadsheets, and so on.

In this example, the storage media switch 122 (switch 122) of the host device 102 is capable of supporting virtualization, providing QoS over a virtual interface, and implementing virtual functions associated with the storage media 124. In some aspects, the storage media switch 122 includes a virtual function (VF) address engine 128, VF mappings 130, a Quality of Service (QoS) Manager 132, and QoS Parameters 134, each of which may be implemented to perform respective operations or functions for supporting virtualization, providing QoS, and enabling virtual functions associated with the storage media 124. The implementations and uses of these entities vary and are described throughout this disclosure.

Generally, the VF address engine 128 may enable virtual function support, for storage media that is not inherently SR-IOV capable as well as for storage media that already supports virtual functions. The VF address engine 128 processes host commands to automatically map the host commands to the appropriate virtual functions. The VF address engine 128 may, in some examples, extract a virtual function identifier from the host command. In other examples, where the storage media 124 inherently supports SR-IOV, the VF address engine 128 may determine the virtual function identifier by looking up a routing identifier associated with the storage media 124 from within the VF mappings 130. Using the VF mappings 130, the VF address engine 128 may determine a virtual function associated with the virtual function identifier. With the virtual function identifier, the VF address engine 128 may select a virtual function of the storage media 124 for executing the host command. Responsive to directing the storage media 124 to execute transactions for implementing the host command, the VF address engine 128 may respond, via the host interface, to the host command.

In various aspects, the QoS manager 132 may ensure that execution of host commands is managed to a quality of service level associated with a particular application, client, host, virtual machine of the host, tenant of the host, or the like. For example, the QoS manager 132 may determine a QoS for a virtual machine executing on a host device 102 and ensure that I/O commands and data access transactions between the host device 102 and storage media 124 to achieve the determined level QoS. Alternately or additionally, the QoS manager 132 may measure and retain values of the QoS parameters 134 that the QoS manager 132 uses when responding to a host command.

The host device 102 may also include I/O ports 136, a graphics processing unit 138 (GPU), and data interfaces 140. Generally, the I/O ports 136 allow a host device 102 to interact with other devices, peripherals, or users. For example, the I/O ports 136 may include or be coupled with a universal serial bus, human interface devices, audio inputs, audio outputs, or the like. The GPU 138 processes and renders graphics-related data for host device 102, such as user interface elements of an operating system, applications, or the like. In some cases, the GPU 138 accesses a portion of local memory to render graphics or includes dedicated memory for rendering graphics (e.g., video RAM) of the host device 102.

The data interfaces 140 of the host device 102 provide connectivity to one or more networks and other devices connected to those networks. The data interfaces 140 may include wired interfaces, such as Ethernet or fiber optic interfaces for communicated over a local network, intranet, or the Internet. Alternately or additionally, the data interfaces 140 may include wireless interfaces that facilitate communication over wireless networks, such as wireless LANs, wide-area wireless networks (e.g., cellular networks), and/or wireless personal-area-networks (WPANs). Any of the data communicated through the I/O ports 136 or the data interfaces 140 may be written to or read from the storage media 124 of the host device 102 in accordance with one or more aspects of this disclosure.

The data interfaces 140 may support a host interface of the storage media switch 122 and a storage media interface of the storage media switch 122. For example, the storage media switch 122 may receive host commands and respond to host commands from the host interface. The storage media switch 122 may direct transactions over the storage media interface to cause the storage media 124 to execute the host commands.

Figure 2:
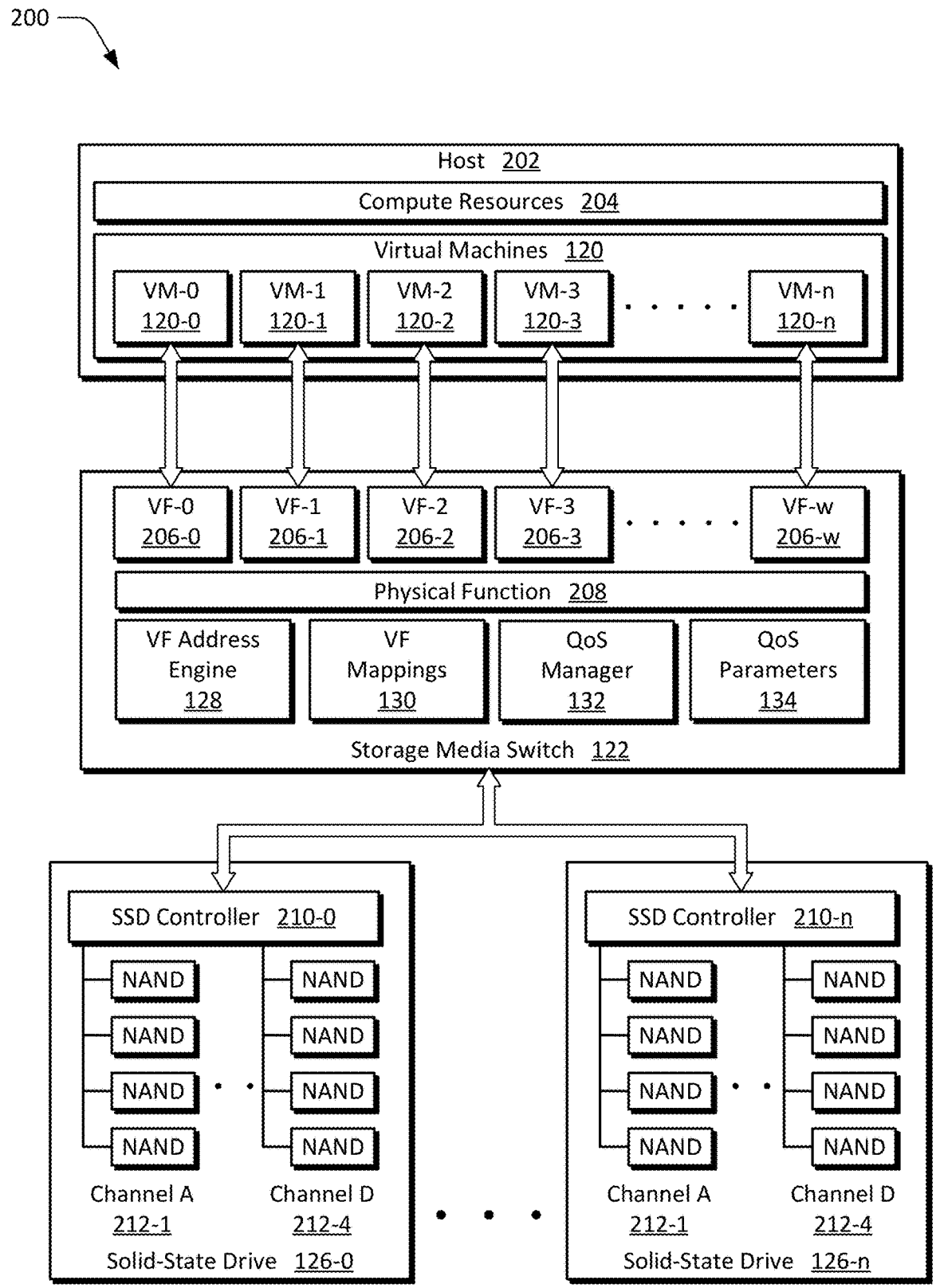
FIG. 2 illustrates example configurations of a storage media switch and solid-state drives shown in FIG. 1.

FIG. 2 illustrates example configurations of a storage media switch 122 and SSDs 126 shown in FIG. 1. In this example, the storage media switch 122 is operably coupled between a host 202 and SSDs 126-0 through 126-n (collectively "SSDs 126") from which virtualized areas, partitions, or segments of storage are provided (e.g., isolated areas of storage). The storage media switch may be coupled to the host 202 and/or the SSDs through one or more respective PCIe interfaces (not shown) that may communicate in compliance with an NVMe protocol (e.g., NVMe rev 1.3) In this example, the host 202 (e.g., a host device 102) includes multiple virtual machines 120 that execute on compute resources 204 of the host. Generally, the compute resources 204 of the host 202 may include combinations of processing resources and system memory of the host 202 which are used to implement the applications, virtual machines, tenants, or initiators that access storage associated with the host 202.

The storage media switch 122 may enable virtual functions on storage media and/or provide QoS over virtual functions for solid-state storage in accordance with one or more aspects. In this example, the storage media switch 122, or a controller thereof (not shown), enables access to storage media associated with the switch through VFs 206-0 through 206-w (collectively "virtual functions 206"). Generally, the virtual functions 206 are focused primarily on data movement between the VMs 120 of the host 202 and storage provided by the SSDs 126 and are each associated with a physical function 208. Although one instance of the physical function 208 is shown, the storage media switch 122 may be implemented with any number and/or combination of physical and virtual functions. The physical function 208 of FIG. 2 may be equivalent to PCI one or more functions of a typical PCIe physical function device. In some cases, the physical function 208 is responsible for arbitration relating to policy decisions, such as link speed or network addresses in use by the VMs 120 in the case of networking, and for handling various input and output transactions between the storage media switch 122 and the VMs 120 and the SSDs 126.

Generally, tenants or initiators of the VMs 120, or the host 202, access data stored in the SSDs 126. In some implementations, the storage media switch 122 presents aggregated storage media, such as SSDs 126, as a virtual disk or storage volume to the host 202 or the VMs 120 of the host. In the context of NVMe, this virtual disk may be segmented or partitioned into different areas that are accessed through a namespace. In other words, data access to the virtual disk or SSDs 126 may be consumed through one or more namespaces that correspond to segments or stripes of the virtual disk or storage media. As shown in FIG. 2, each of the SSDs 126 may be implemented with an SSD controller 210-0 through 210-n through which NAND channels 212-1 through 212-4 are accessible. Each channel 212 of NAND (e.g., channel A or NAND channel 212) includes multiple NAND devices, which may be implemented as separate NAND devices or NAND dies of the SSD 126 that are accessible or addressable through a respective NAND channel.

In some aspects, the storage media switch 122 manages access to the virtual functions 206. For example, the storage media switch 122 may exchange information, including host commands, with the host 202, such as facilitate data access between the SSDs 126 and host memory. In some cases, the storage media switch 122 determines virtual function identifiers associated with the host commands and automatically selects the virtual functions 206 based on the virtual function identifiers. Alternatively, the switch selects the virtual functions 206 based on the virtual functions 206 specified in the host commands, e.g., by matching the virtual functions 206 to drive request identifiers of the SSDs 126.

The storage media switch 122, or a processor of the switch 122 (not shown), may also execute the host commands of the virtual functions 206, and after execution, respond to each of the host commands. By automatically mapping the virtual functions 206 in this way, the storage media switch 122 enables SR-IOV for or on any of the SSDs 126, including any of the SSDs 126 that lack native support for virtual functions or SR-IOV-based features.

Figure 3:
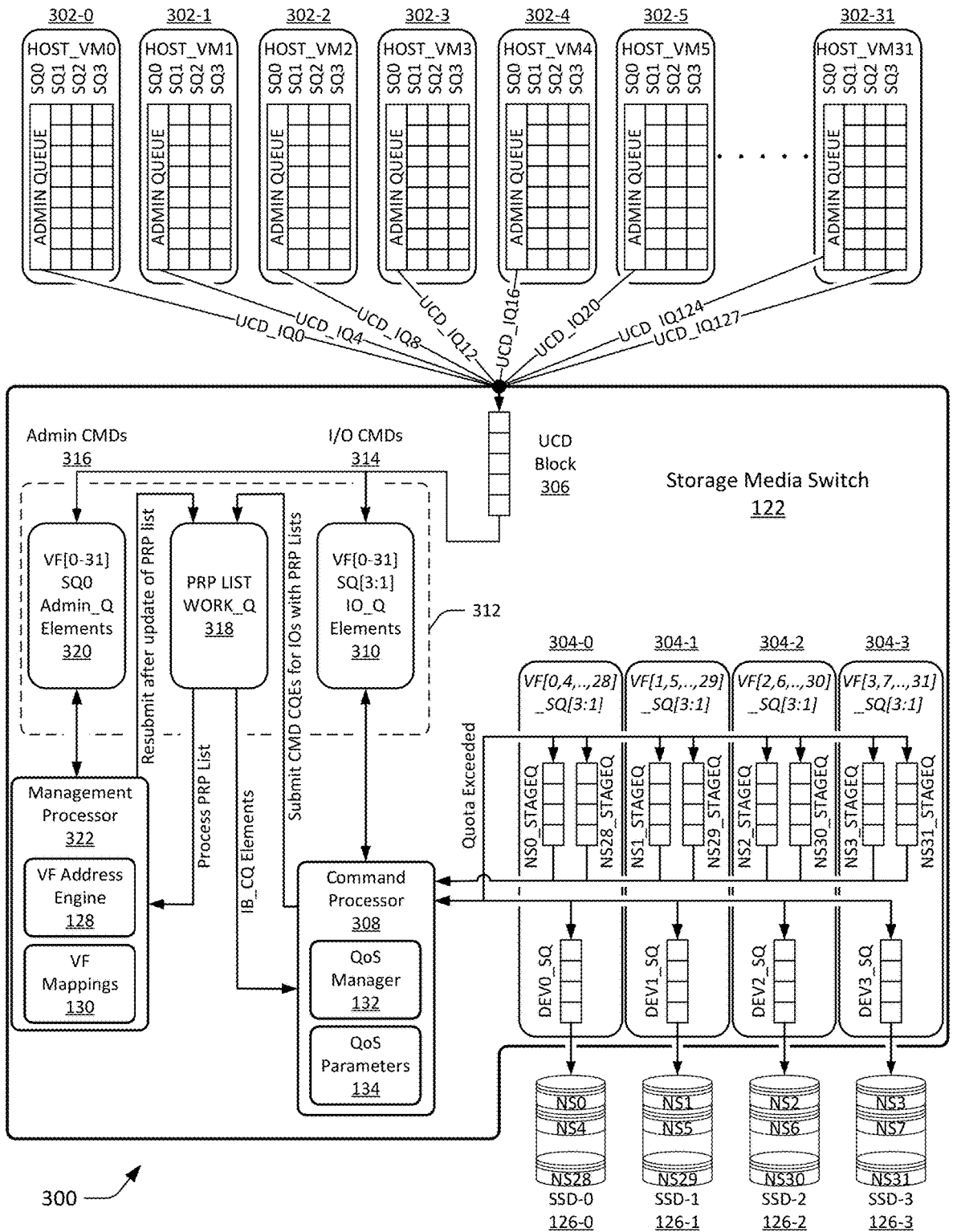
FIG. 3 illustrates an example configuration of a storage media switch associated with a host and multiple solid-state drives in accordance with one or more aspects.

FIG. 3 illustrates an example configuration of a storage media switch 122 (switch 122) associated with a host and multiple solid-state drives generally at 300, which are implemented in accordance with one or more aspects of providing QoS over a virtual interface for solid-state storage. In this example, the switch 122 is operably coupled between a host 202 (not shown) and an array of SSDs 126, which have each been segmented into eight horizontally striped namespaces (NS0 through NS31). Each of the SSDs 126 may be connected to the switch 122 via an NVMe interface, such as an NVMe interface implemented over a x4, x8, or x16 PCIe interface. Alternately or additionally, the host 202 may be connected to the switch by an NVMe interface to enable data transaction through the switch 122 to the SSDs 126 or other storage.

Generally, the NVMe specification or protocol supports namespace-based access of storage media or SSDs in this example. In aspects of providing QoS, a virtual function of the switch 122 is mapped to a namespace for a segment or partition of the virtual disk. By so doing, QoS may be enabled and managed using a namespace, such that VMs or tenants may subscribe to a level of service for storage access which is administered through namespace-based access of the storage media. In other words, a client or customer subscribes to a pre-defined amount of bandwidth and is connected to a virtual function on the host or by the host. This virtual function, which is mapped to the namespace within the switch 122, is allocated bandwidth or access to the storage media based on a threshold or quota assigned to the namespace, such as in accordance with the subscription for data access at a particular service level. Within an NVMe subsystem of the switch 122, multiple isolated domains may be supported through the use of the virtual functions provided through SR-IOV over PCIe. By so doing, an administrator on the host can plug tenants into different address domains into this, such as VMs, and provide isolated and distinct access to the storage, and this access and consumption of the storage is made through the form of namespaces.

Returning to FIG. 3, the host 202 may be implemented as a multi-tenant host with any suitable number of virtual machines or tenants having access to respective NVMe command queues. In this example, the host 202 includes 32 VMs (not shown) that each have sets of NVMe queues 302-0 through 302-31 that are mapped to respective virtual functions 304 (VF0-VF31, grouped as VF 304-0 through VF 304-31) of the switch 122. These NVMe queues 302-0 through 302-31 may be implemented in host memory and configured by the host to be any suitable number of administrative queues (admin queues) or I/O command queues. Here, each VM is allocated four queues with one configured as an admin queue and three configured as I/O command queues.

In some aspects, inbound and outbound queue engines of a hardware layer of the switch 122 may support up to 128 NVMe host submission queues (SQ) and host completion (CQ) queue pairs. Each of these queues may be individually mapped to any of the PCIe physical functions or virtual functions provided by the storage media switch 122. A host device or server implementing the VMs may associate each host VM to a respective VF 304 within the switch 122. The VM may map the NVMe queues associated with the VM to a respective VF 304 within the switch 122 and/or further bind the NVMe queue to any of the SQ or CQs queues provided by the switch 122. In other words, a VM manager running on a host (e.g., server) may associate each host VM with a respective VF. Thereafter a VM itself may map the NVMe queues in its space with that VF, thereby effective to cause the NVMe queue to be bound to any of the SQs or CQs provided by the switch 122.

With respect to priority, the submission queues within a VM may be assigned equal, higher or lower priority through an NVMe based arbitration policy (Fixed or Weighted-Round Robin) that is available or configurable on a per queue basis. This may be useful when one or more VMs use different ones of the multiple submission queues to prioritize certain commands associated with particular applications or workloads. Errors and exceptions for VF operations in this configuration are also isolated and detected on a per VF basis. Accordingly, errors originating with one VF of the switch 122 do not disturb I/O command flow of other VFs of the switch. Alternately or additionally, selective resets of states for specific VFs are enabled, such as function level resets or the like.

With reference to command flow, four universal command delivery (UCD) inbound queues are mapped per VF 304 in this example implementation for the switch 122. Alternately, the architecture of the switch 122 has the flexibility to assign greater or fewer numbers of queues per VF as long as a total queue distribution of VFs does not exceed a total number of queues supported by the switch 122 (e.g., 128 queues). Generally, host VMs will submit admin commands or I/O commands to respective submission queues (SQs) and ring a corresponding UCD doorbell for that queue. Universal command delivery block (UCD block 306) may fetch, responsive to the doorbell, SQ elements based on a pre-configured arbitration scheme of the switch 122. For example, if all I/O SQs are setup for equal priority, then the UCD block 306 will service these inbound queues in a round-robin fashion. From the UCD block 306 or UCD inbound queue, the switch 122 submits the fetched elements (e.g., admin or I/O commands) to a command classifier processor (CCP or command processor 308). The fetched elements may be submitted using a destination free list (DFL) of an I/O queue block 310 of a command processing subsystem 312 (subsystem 312) that includes or is associated with the command processor 308. Generally, the UCD block 306 will sort and distribute I/O commands 314 and admin commands 316 to corresponding queues or blocks of the subsystem 312, which in this example also includes an admin queue block 318 and a physical region page (PRP) list work queue block 320.

Figure 4:
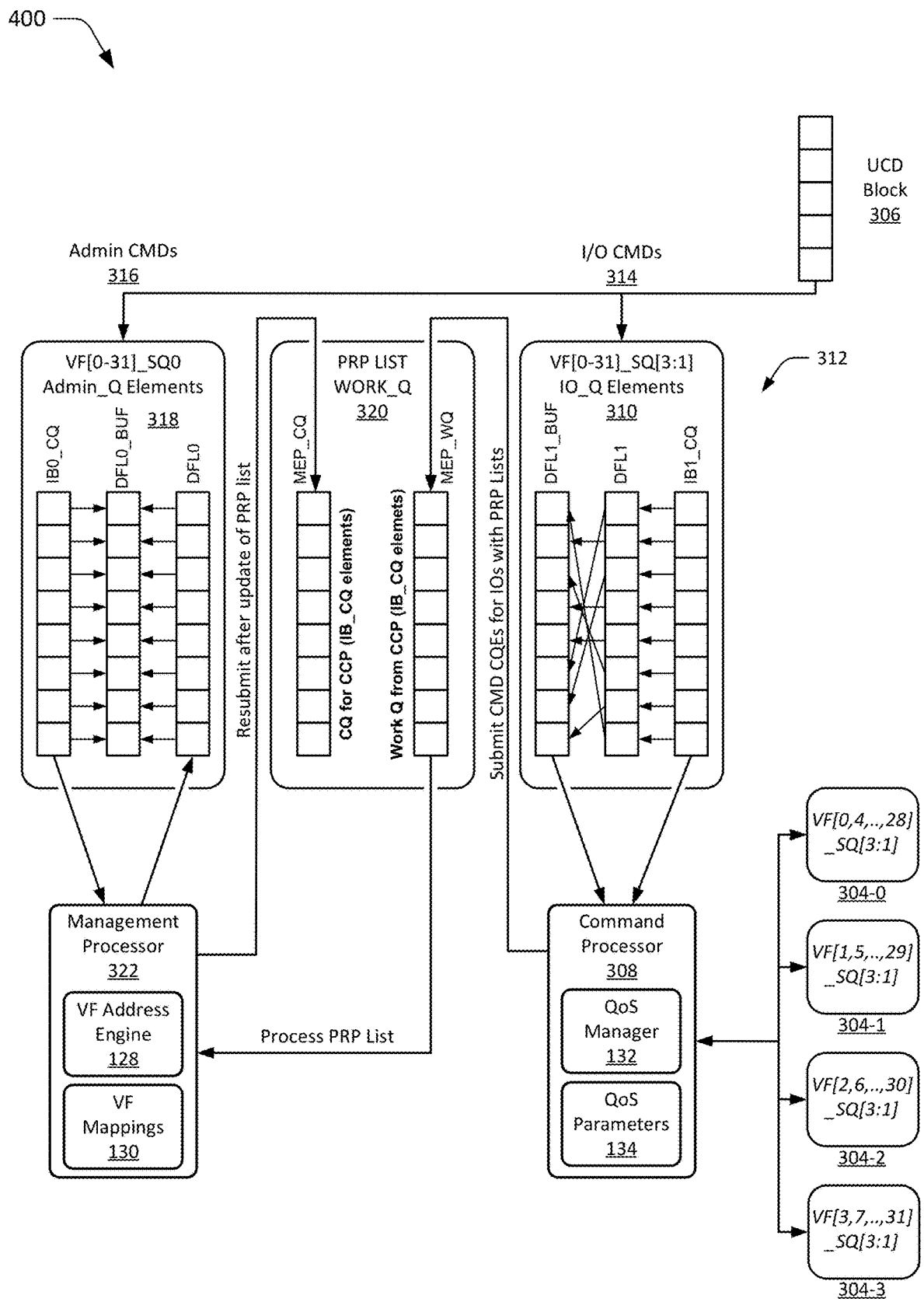
FIG. 4 illustrates example configurations of various storage media switch queues in accordance with one or more aspects.

By way of example, consider FIG. 4 in which an example configuration of a command processing subsystem 312 is shown generally at 400. Here, the UCD block 306 may submit commands to the command processor 308 using a destination free list (DFL) assigned to a queue being fetched. The DFL generates an inbound completion queue element (IB_CQ) to the command processor 308 based on the arbitration priority assigned to the queue. Generally, the command processor 308 or the QoS manager 132 monitors the inbound completion queue for new elements and upon receiving one, starts the command processing operations.

In some aspects, the PRP list work queue enables access through the VFs 304 of the switch 122. For example, VFs may use PRP data-pointers that include a virtual function (VF) identifier, inserted by a processor or VF address engine, within upper-address bits for proper routing within the switch 122. With respect to command routing, a I/O command that does not include or rely on a physical region page (PRP) list fetch (e.g., I/O commands less than 8 Kb in size) will be handled by the command processor 308 such that the PRP data pointers embedded in the I/O command may be processed before submission to a SSD device queue. Alternately, an I/O command that includes or relies on PRP list fetch (e.g., an I/O command greater than 8 Kb in size) is routed to the management and execution processor 322 (MEP or management processor 322), through the PRP list work queue, so that the PRP list may be processed before submitting the command to the SSD device queue.

In some aspects of providing QoS, firmware of the command processor 308 or the QoS manager 132 tracks bandwidth used per namespace over a pre-defined duration of time. In some cases, the QoS manager 132 adds a logical block address (LBA) count per I/O per namespace as the commands are processed by the command processor 308. Once the LBA count exceeds a predefined threshold or quota for a particular namespace, any additional commands for that namespace would be delayed or held back in a respective staging queue (NSm_STAGE_Q) for each namespace.

After being delayed for at least some amount of time, the commands stored in the staging queue will be reevaluated for submission to a SSD device submission queue (DEVn_SQ). In some cases, the commands are reevaluated once a new timing window starts for servicing namespace queues or fetching inbound command elements. Alternately, reevaluation may be initiated responsive to the inbound completion queue (IBn_CQ) to the command processor or the device submission queue (DEVn_SQ) reaching an empty state. In some cases, the former is an indication that, during a current timing window, there are no new elements fetched by the UCD block 306 that need evaluation.

To release or submit I/O commands or elements into a submission queue of a storage device, the command processor 308 should evaluate the various work queues in the following order: namespace staging queue (NSm_STAGE_Q) corresponding to the device submission queue (DEVn_SQ), followed by the completion queue of the management processor 322 (MEP_CQ), and finally the inbound completion queue (IBn_CQ) of the I/O queue block or DFL queues. This order of queue priority may be reconfigured by the command processor 308 as needed or in order to support alternate implementations of providing QoS through the switch 122.

Figure 5:
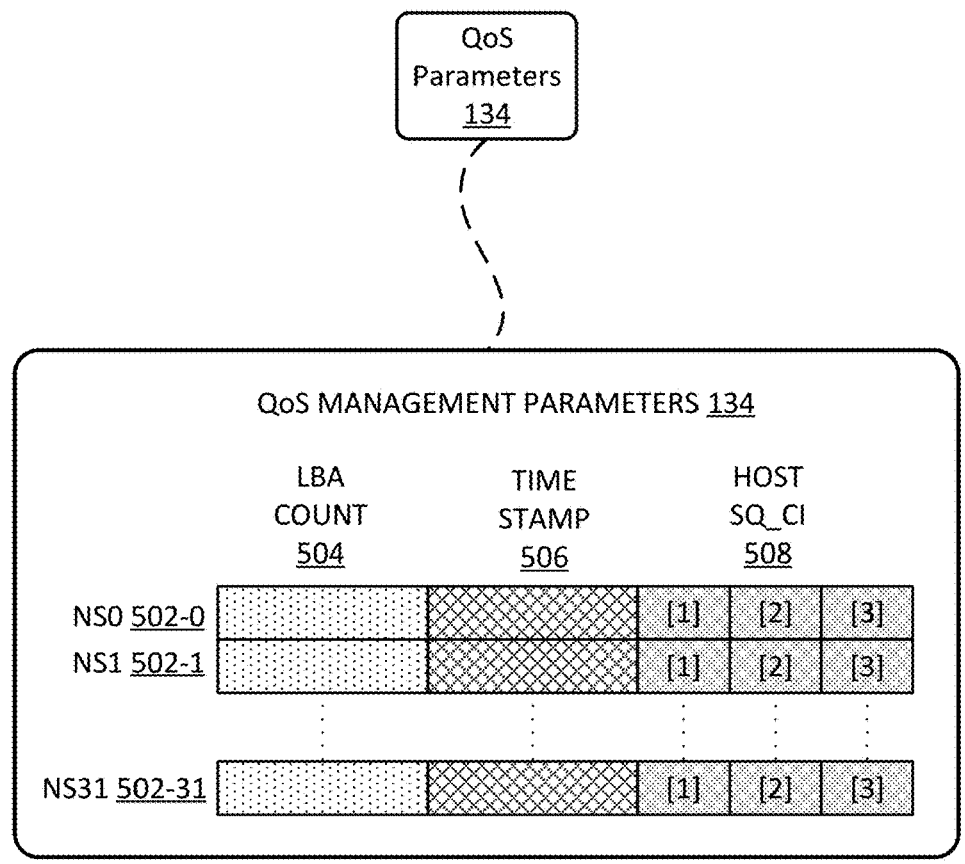
FIG. 5 illustrates example configuration of QoS parameters that are useful to implement QoS in accordance with one or more aspects.

FIG. 5 illustrates at 500 example configurations of QoS parameters 134 that are useful to implement QoS in accordance with one or more aspects. In this example, the QoS parameters 134 are organized with reference to namespaces 502-0 through 502-31, which may correspond to the striped namespaces for the SSDs 126 referenced in FIG. 3. Generally, the QoS parameters 134 include values useful to define or quantify a bandwidth of access provided to a namespace, such as an amount of data and a duration of time. In this example, the QoS parameters 134 includes an LBA count 504, a time stamp 506, and a host submission queue consumer index 508. Alternately or additionally, the QoS parameters may include or reference a physical region page (PRP) list of the I/O command (e.g., for a number of LBAs or IOPs), a scatter gather list of the I/O command (e.g., for a number of LBAs or IOPs), a number of I/O operations associated with the I/O command, or a logical block address (LBA) count of the I/O command.

Techniques for Providing QoS over a Virtual Interface

The following discussion describes techniques for providing QoS over a virtual interface for solid-state storage, which may provide storage isolation, bandwidth control, and partition functionalities to a host, tenants, or VMs executing on the host. These techniques may be implemented using any of the environments and entities described herein, such as the VF address engine 128, VF mappings 130, QoS manager 132, or QoS parameters 134. These techniques include methods illustrated in FIG. 6, FIGS. 7a and 7b, and/or FIGS. 9-11 each of which is shown as a set of operations performed by one or more entities.

These methods are not necessarily limited to the orders of operations shown in the associated figures. Rather, any of the operations may be repeated, skipped, substituted, or re-ordered to implement various aspects described herein. Further, these methods may be used in conjunction with one another, in whole or in part, whether performed by the same entity, separate entities, or any combination thereof. For example, the methods may be combined to expose virtualized isolation areas of storage media while transparently providing wear leveling, load balancing, or data migration without host interaction or involvement. In portions of the following discussion, reference will be made to the operating environment 100 of FIG. 1 and entities of FIG. 2, FIG. 3, FIG. 4, and/or FIG. 5 by way of example. Such reference is not to be taken as limiting described aspects to the operating environment 100, entities, or configurations, but rather as illustrative of one of a variety of examples. Alternately or additionally, operations of the methods may also be implemented by or with entities described with reference to the System-on-Chip of FIG. 12 and/or the storage media switch controller of FIG. 13.

Figure 6:
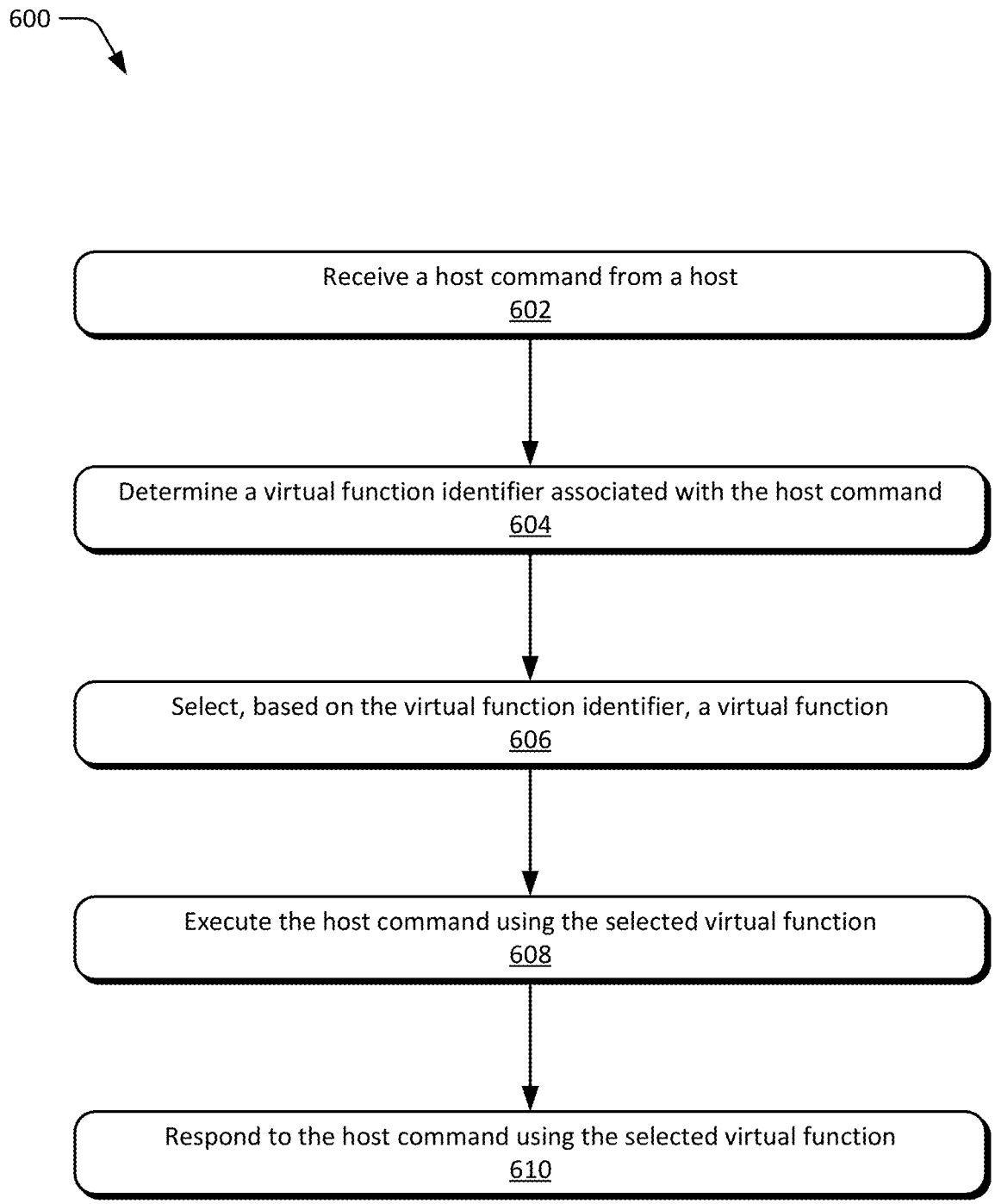
FIG. 6 depicts an example method for automatically mapping host commands to virtual functions on storage media.

FIG. 6 depicts an example method 600 for automatically mapping host commands to virtual functions on storage media. The operations of method 600 may be performed by or with the storage media switch 122, including the VF address engine 128 and using the VF mappings 130.

At 602, the storage media switch 122 receives, via a host interface of the storage media switch 122, a host command from a host. For example, the VF address engine 128 of the storage media switch 122 may receive an indication of a new host command obtained from a host software application executing at the virtual machine VM-0.

At 604, responsive to receiving the host command, the storage media switch 122 determines a virtual function identifier associated with the host command. For example, an unused portion of a virtual address field of the host command may be filled with a sign-extended canonical portion of the address contained within the virtual address field. Rather than treat the entire unused portion of the address field as a sign-extended canonical portion of the address, the storage media switch 122 may infer a virtual function identifier from the unused portion of the virtual address field and use the virtual function identifier to route the host command to be fulfilled by an appropriate virtual function.

As one example, a host command may include a 64-bit virtual address field, e.g., bits [63:0], even though only a portion of the virtual address field, e.g., bits [48:0], may be used as a virtual address of the host command. Since some of the virtual address field may be unused by the storage media switch 122 for addressing the host command, the unused portion of the virtual address field, e.g., bits [63:49], may include other information associated with the host command, such as a virtual function identifier, that the storage media switch 122 may use to execute the host command.

Some of the unused portion of the virtual address field may include a virtual function identifier. The storage media switch 122 may extract a virtual function identifier associated with the host command from a first unused portion of virtual address field contained within the host command. For example, bits [62:58] may include the virtual function identifier that the storage media switch 122 uses to identify a particular virtual function associated with the command.

At 606, the storage media switch 122 selects, based on the virtual function identifier, a virtual function of the storage media 124 for executing the host command. For example, the VF address engine 128 may further isolate tagged portions of an address field of a host command to determine a host identifier. That is, some of the unused portion of the virtual address field may include a host identifier and the storage media switch 122 may extract a host identifier associated with the host command from a second unused portion of virtual address field contained within the host command. For example, bit [63] may include the host identifier that the storage media switch 122 uses to identify a particular host associated with the command.

The VF mappings 130 maintains associations or mappings between virtual function identifiers and respective virtual functions and respective hosts. For example, the VF mappings 130 may maintain a mapping between host identifiers and virtual function identifiers to hosts and virtual functions. The VF address engine 128, having determined a virtual function identifier and a host identifier from the unused portion of the virtual address contained within the host command or from a sign-extended canonical portion of the of the virtual address contained within the host command, uses the virtual function identifier and a host identifier to lookup a corresponding virtual function using the VF mappings 130.

The VF address engine 128 may look up a particular host identifier (e.g., bit [63]) from the VF mappings 130 to determine which host is associated with the particular host identifier and therefore, which host is the originator of the host command. The VF address engine 128 may search the VF mappings 130 to determine a virtual function for the host command that matches a particular virtual function identifier (e.g., bits [62:58]).

At 608, the storage media switch 122 executes the host command using the virtual function assigned to the storage media 124. For example, using the host identifier and the virtual function identifier, the VF address engine 128 generates an internal interface select value to route the host command to the intended virtual function at the storage media interface of the storage media switch 122. The storage media switch 122 may use the interface select value to finally route and cause the storage media 124 to execute read/write transactions to satisfy the host command.

At 610, responsive to executing transactions for satisfying the host command, using the virtual function assigned to the storage media 124, the storage media switch 122 responds, via the host interface, to the host command. For example, in response to directing the storage media 124 to execute transactions to satisfy the host command, the storage media switch 122 prepares a response to the host command by determining an original address for the host command. The VF address engine 128 may use only a portion of an internal routing address (e.g., without the interface select value) to determine the original address for the host command. The VF address engine 128 may remove the bits containing the interface select value from the routing address and use the remaining bits as the original address. For example, the original address may include bits [63:0] with bits [48:0] corresponding to bits [48:0] of the original, virtual address, and bits [63:49] corresponding to a host-preferred predefined value or a canonical sign-extended value of the original virtual address.

The storage media switch 122 causes the host command to exit the host interface using the original address, without any virtual function tagging. In other words, the above operations show that the storage media switch 122 may determine the original address associated with a host command to respond to the host. The storage media switch 122 determines the original address by removing the virtual function identifier tagged to the virtual address contained within the host command, replacing the virtual function identifier with a host preferred predefined value, or a sign-extended canonical portion of the rest of the virtual address.

Figure 7A:
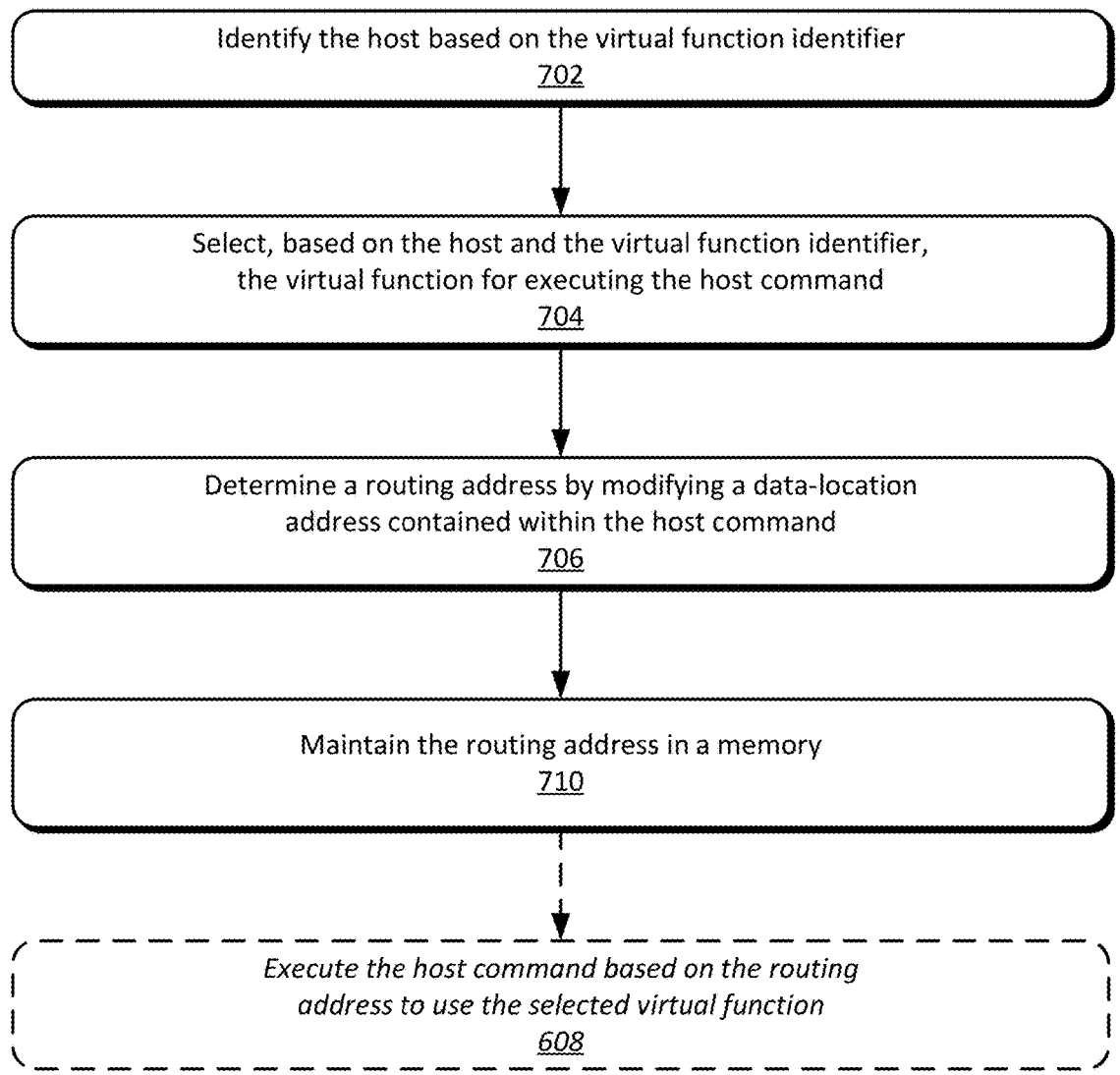
FIG. 7A depicts an example method for selecting a virtual function of storage media.

FIG. 7A depicts an example method 700A for selecting a virtual function of the storage media for executing the host command, based on a virtual function identifier determined by the associated submission queue the host command was received in. The method 700A is an example of operations performed by the storage media switch 122 when executing the step 606 from the method 600 for automatically mapping host commands to virtual functions on storage media. The operations of method 700A may be performed by or with the storage media switch 122, including the VF address engine 128 and using the VF mappings 130.

Recall, at 606, the storage media switch 122 selects, based on the virtual function identifier, a virtual function of the storage media 124 for executing the host command. For example, the VF address engine 128 may isolate tagged portions of an address field of a host command to determine a host identifier and a virtual function identifier.

At 702, the storage media switch 122 identifies, based on the virtual function identifier associated with the host command, the host. The VF mappings 130 maintains associations or mappings between virtual function identifiers and respective virtual functions and respective hosts. For example, the VF mappings 130 may maintain a mapping between host identifiers and virtual function identifiers to hosts and virtual functions. The VF address engine 128 may determine a virtual function identifier and a host identifier from the unused portion of the virtual address contained within the host command. The VF address engine 128 may determine the virtual function identifier and the host identifier from a sign-extended canonical portion of the of the virtual address contained within the host command.

For example, the VF address engine 128 may look up a particular host identifier (e.g., bit [63] of the address field of the host command) from the VF mappings 130 to determine that a software application executing at the at the virtual machine VM-0 is the host associated with the particular host identifier and therefore, is the originator of the host command. The VF address engine 128 may search the VF mappings 130 to determine a virtual function for the host command that matches a particular virtual function identifier (e.g., bits [62:58] of the address field of the host command).

At 704, the storage media switch 122 selects, based on the host and the virtual function identifier, the virtual function assigned to a storage media interface of the storage media switch 122 for executing the host command. For example, by inputting the host identifier and the virtual function identifier into the VF mappings 130, the VF address engine 128 may obtain a predefined internal interface routing value to use for engaging the appropriate virtual function.

At 706, the storage media switch 122 determines a routing address by modifying the a data-location address contained within the host command. For example, the VF address engine 128 may modify the virtual address contained within the host command to append an interface select value assigned to the virtual function to the virtual address contained within the host command. The VF address engine 128 may append the interface routing value to the front of the virtual address contained in the virtual address field of the host command to form a routing address (also referred to as a "modified virtual address"). The routing address may be a different size than the original virtual address extracted from the address field of the host command. For instance, the routing address may be a 72-bit value with bits [71:64] being the routing value and bits [63:0] being the original virtual address contained in the address field of the host command.

In some cases, the VF address engine 128 replaces any tagged or encoded portions of the routing address with a predefined value or a sign-extended canonical format. For instance, the routing address may be a 72-bit value with bits [71:64] being the routing value and bits [63:0] being the virtual address contained in the address field of the host command without any tagging or encoding of unused bits specifying the virtual function or host identifiers. The VF address engine 128 may swap the routing value with a portion of the virtual address that is without the tagging or encoding originally included in the virtual address to derive a routing address for use in executing the read/write transactions associated with the host command. For example, the routing address may be a 72-bit value with bits [71:63] being the first eight bits of the virtual address contained in the address field of the host command without any tagging, the next eight bits [62:55] being the interface select value, and bits [54:0] being the rest of the virtual address contained in the address field of the host command without any tagging. The storage media switch 122 uses the internal routing address to command the storage media 124 to execute transactions for satisfying the host command.

At 708, the storage medium switch 122 may maintain the routing address in memory for subsequent retrieval and use after executing transactions for fulfilling the host command.

From operation 708, the storage medium switch 122 may proceed to operation 608 to execute the host command based on the routing address to effective to use the selected virtual function. For example, the storage medium switch may perform operations or transactions at an area of the storage media 124 that maps to the routing address determined above.

Figure 7B:
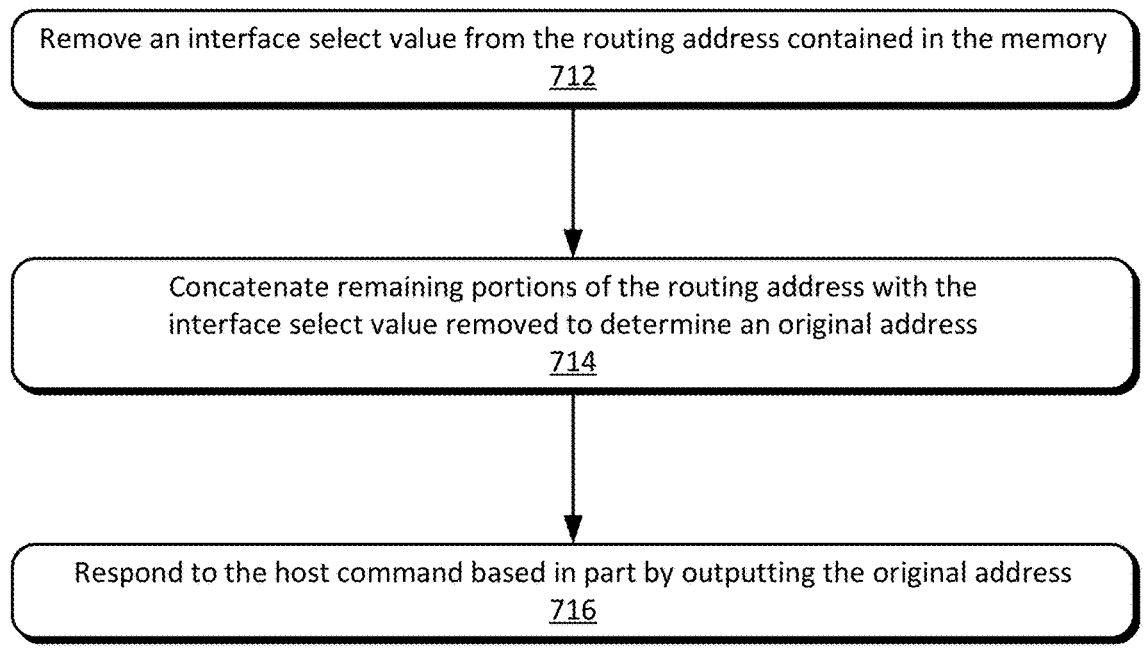
FIG. 7B depicts an example method for responding to a host command, in accordance with one or more aspects of this disclosure.

FIG. 7B depicts an example method 700B for responding to a host command. The method 700B is an example of operations performed by the storage media switch 122 when executing the step 610 from the method 600 for automatically mapping host commands to virtual functions on storage media. The operations of method 700B may be performed by or with the storage media switch 122, including the VF address engine 128 and using the VF mappings 130. In response to directing the storage media 124 to execute transactions to satisfy the host command, the storage media switch 122 prepares a response to the host command by determining an original address for the host command. At 712, the storage media switch 122 removes the interface select value from the routing address maintained in the memory. For example, the VF address engine 128 may use only a portion of the 72-bit internal routing address (e.g., without the interface select value) as the original address for the response to the host command. The VF address engine 128 may remove the bits containing the interface select value (e.g., bits [62:55]) from the routing address maintained in the memory.

At 714, the storage media switch 122 concatenates the remaining portions of the routing address, with the interface select value removed to determine an original address. For example, the storage media switch 122 may generate a 64-bit original address using a first remaining portion (e.g., bits [71:63]) of the routing address concatenated with a second remaining portion (e.g., bits [54:0]) of the routing address. By removing the interface select value (e.g., bits [62:55]) from the routing address, an original address (e.g., 64-bits) address remains with bits [63:56] corresponding to bits [71:63] of the routing address and bits [55:0] corresponding to bits [54:0] of the routing address.

At 716, the storage media switch 122 outputs the host command with the original address, and without any virtual function tagging. The storage media switch 122 may provide the original address via the host interface and to the host as part of responding to the host command.

By performing the method 700B, the storage media switch 122 may determine an original address associated with a host command for use in responding to the host command. The storage media switch 122 determines the original address by removing any virtual function tagging from the virtual address contained within the host command, and replacing the virtual function tagging with a host preferred predefined value, or a sign-extended canonical portion of the rest of the virtual address.

Figure 8:
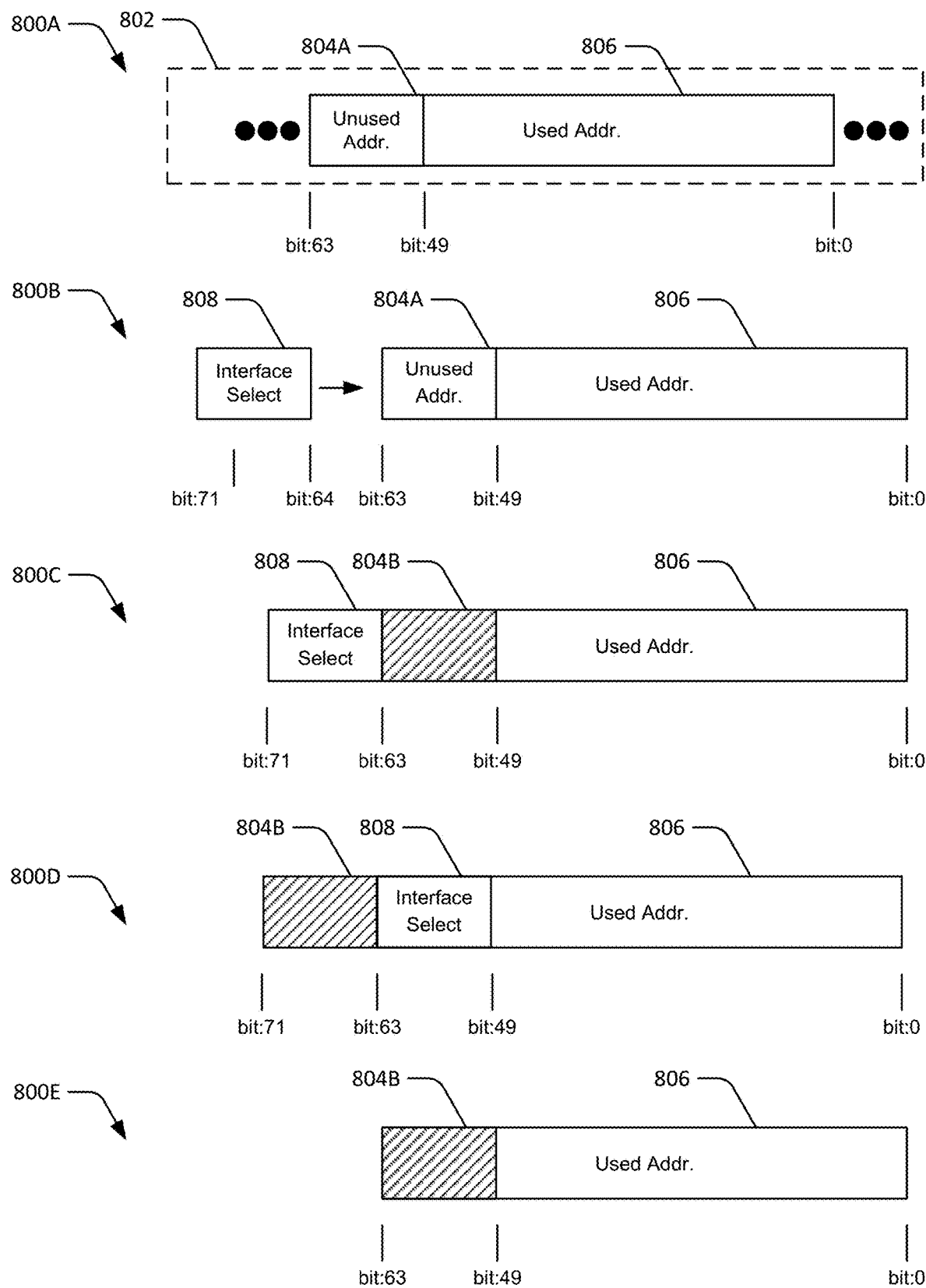
FIG. 8 is a conceptual diagram illustrating manipulations of an address field of a host command when the host command is mapped to virtual functions on storage media.

FIG. 8 is a conceptual diagram illustrating manipulations of an address field of a host command when the host command is mapped to virtual functions on storage media. FIG. 8 includes example address fields 800A through 800E. Each of the address fields 800A through 800E is associated with a host command 802.

FIG. 8 shows that the storage media switch 122 may receive a host command 802 including address field 800A. Address field 800A includes an unused address portion 804A (e.g., bits [63:49]) and a used address portion 806 (e.g., bits [48:0]).

The storage media switch 122 may create an address field 800B by modifying the host command 802 by appending an interface select value 808 to the front of the address field 800A. The address field 800B includes an interface select value 808 (e.g., bits [71:64), an unused address portion 804A (e.g., bits [63:49]), and a used address portion 806 (e.g., bits [48:0]). Because of the addition of the interface select value 808, the address field 800B is shown as having a greater size (e.g., 72-bits) than the address field 800A (e.g., 64-bits).

The storage media switch 122 may modify the unused address portion 804A of the address field 800B to remove any encoding or tagging to create the address field 800C. For example, the address field 800C corresponds to the address field 800B except the unused address portion 804A includes different information as unused address portion 804B. For instance, the storage media switch 122 may remove any encoding or tagging and replace the encoding or tagging with a predefined, host specified value, or may sign-extend a canonical value associated with the used address portion 806 (e.g., by replicating the value of bit [48] to each of the bits [63:49].

The storage media switch 122 may generate the address field 800D, referred to as a routing address 800D, by swapping the position of the interface select value 808 with the position of the unused address portion 804B. For example, the address field 800D corresponds to the address field 800C except the unused address portion 804B is at bits [71:64] and the interface select value 808 is at bits [63:49].

The storage media switch 122 may use the routing address 800D to direct the storage media 124 to execute transactions for fulfilling the host command. Once the transactions are complete, the storage media switch 122 may respond to the host command by outputting a response that includes an original address included in the address field 800E.

The storage media switch 122 may generate the address field 800E by removing the interface select value 808 from the address field 800D and concatenating the untagged and unused address portion 804B with the used address portion 806 to form a new original address. The address field 800E includes 64 bits, with bits [63:49] corresponding to the untagged, unused address portion 804B and bits [48:0] corresponding to the address portion 806.

In the examples of FIGS. 6-8, the storage media 124 may be SR-IOV incompatible. In other words, the storage media 124 may rely on the storage media switch 122 to map virtual functions on the storage media 124 as described above. In some examples however, the storage media 124 may natively support SR-IOV and may already be configured to support virtual functions. In cases where the storage media 124 already supports SR-IOV, the storage media switch 122 may rely on the native SR-IOV support to automatically map to virtual functions.

For example, the storage media switch 122 may determine a routing identifier (RID) associated with a host command. The RID may be a bus number, device number, or function number value assigned to the storage media 124. The VF address engine 128 may look up the RID at the VF mappings 130 to determine a host identifier and an associated virtual function identifier.

The storage media switch 122 may then execute steps 606 through 610 to execute any necessary read or write transactions to execute and then respond to the host command. For example, with a host identifier and a virtual function identifier, the storage media switch 122 may determine an interface select value from the VF mappings 130. The VF address engine 128 may append the interface select value to the address derived from the unencoded or untagged host command to form a routing address. The VF address engine 128 may swap the interface select bits (e.g., bits [71:64]) with a portion of the address (e.g., bits [63:56]) to generate the routing address that the storage media switch 122 uses to execute the host command transactions. At the completion of the host command transactions, the storage media switch 122 responds to the host command by outputting an original address determined by omitting the interface select bits (e.g., bits [63:56]) from the routing address to generate the original (e.g., 64-bit) address that came in with the host command.

Figure 9:
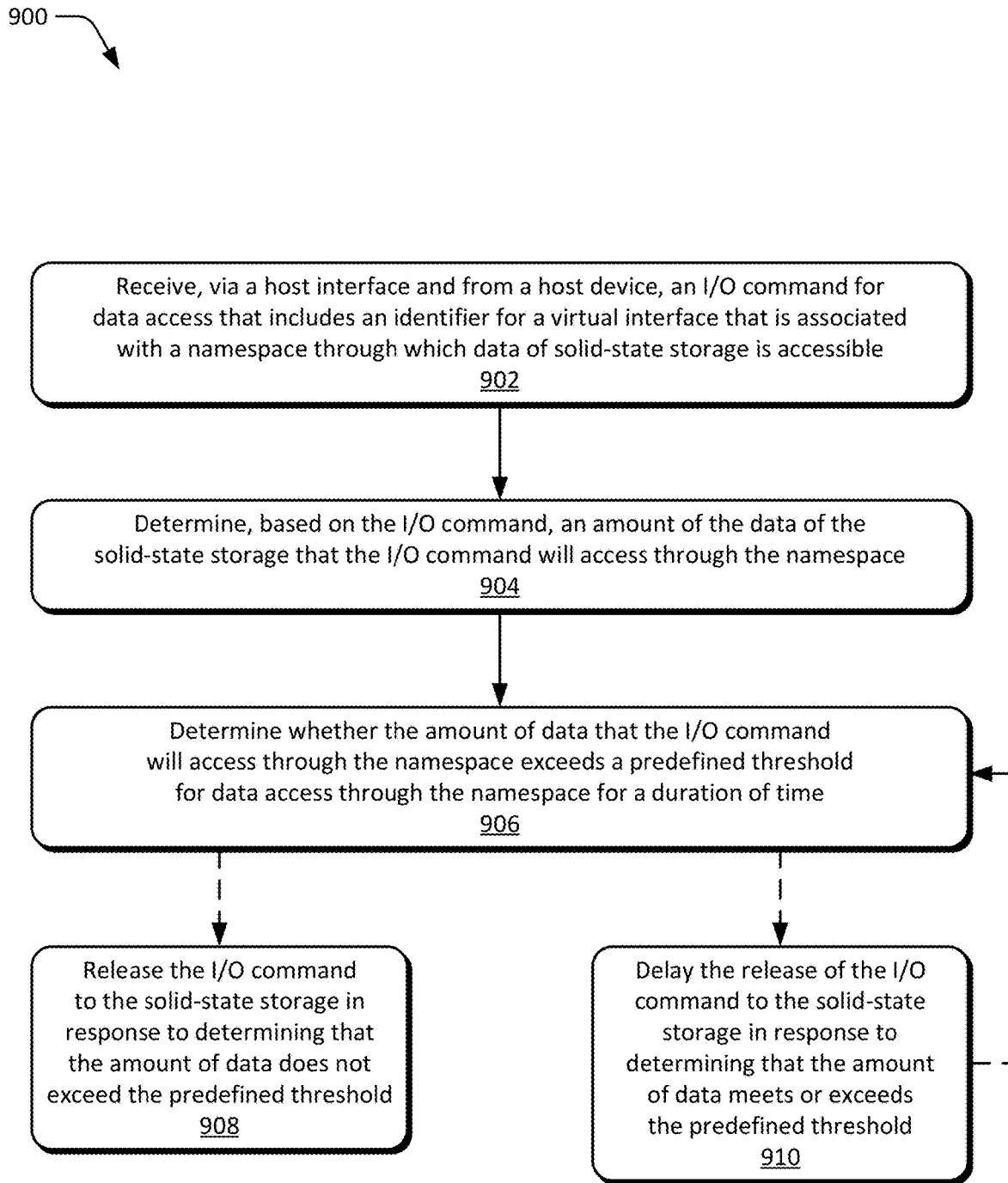
FIG. 9 depicts an example method for providing QoS for solid-state storage accessed through a namespace.

FIG. 9 depicts an example method 900 for providing QoS for solid-state storage that is accessed through a namespace. The operations of method 900 may be performed by or with the storage media switch 122, including the QoS manager 132 or using the QoS parameters 132.

At 902, the storage media switch receives, via a host interface, an I/O command for data access from a host device. The I/O command includes an identifier for a virtual interface that is associated with a namespace through which data of solid-state storage is accessible. In some cases, the I/O command is received through a first queue of inbound command elements received from the host device, such as a VM submission queue of I/O commands. The virtual interface associated with the namespace may include a SR-IOV PCIe interface or a virtual function (VF) provided through a SR-IOV PCIe interface. In such cases, a first set of queues associated with the namespace may be mapped to the VF. Alternately or additionally, a second set of queues associated with a VM executed by the host may be mapped to the VF effective to bind the first set of queues to the second set of queues.

At 904, the QoS manager determines, based on the I/O command, an amount of data of the solid-state storage that the I/O command will access through the namespace. In some cases, the amount of data is determined based on one of a PRP list of the I/O command, a scatter gather list of the I/O command, a number of I/O operations associated with the I/O command, or an LBA count of the I/O command.

At 906, the QoS manager determines whether the amount of data that the I/O command will access through the namespace exceeds a predefined threshold for data access through the namespace over a duration of time. For example, the QoS manager may compare a number of LBAs accessed through the namespace with an LBA quota for that nam space.

Optionally at 908, the QoS manager releases the I/O command to the solid-state storage in response to determining that the amount of data does not exceed the predefined threshold. Alternately at 910, the QoS manager delays the release of the I/O command to the solid-state storage in response to determining that the amount of data meets or exceeds the predefined threshold. By so doing, the switch may provide QoS for the virtually accessed solid-state storage based on an access parameter of the namespace.

Figure 10:
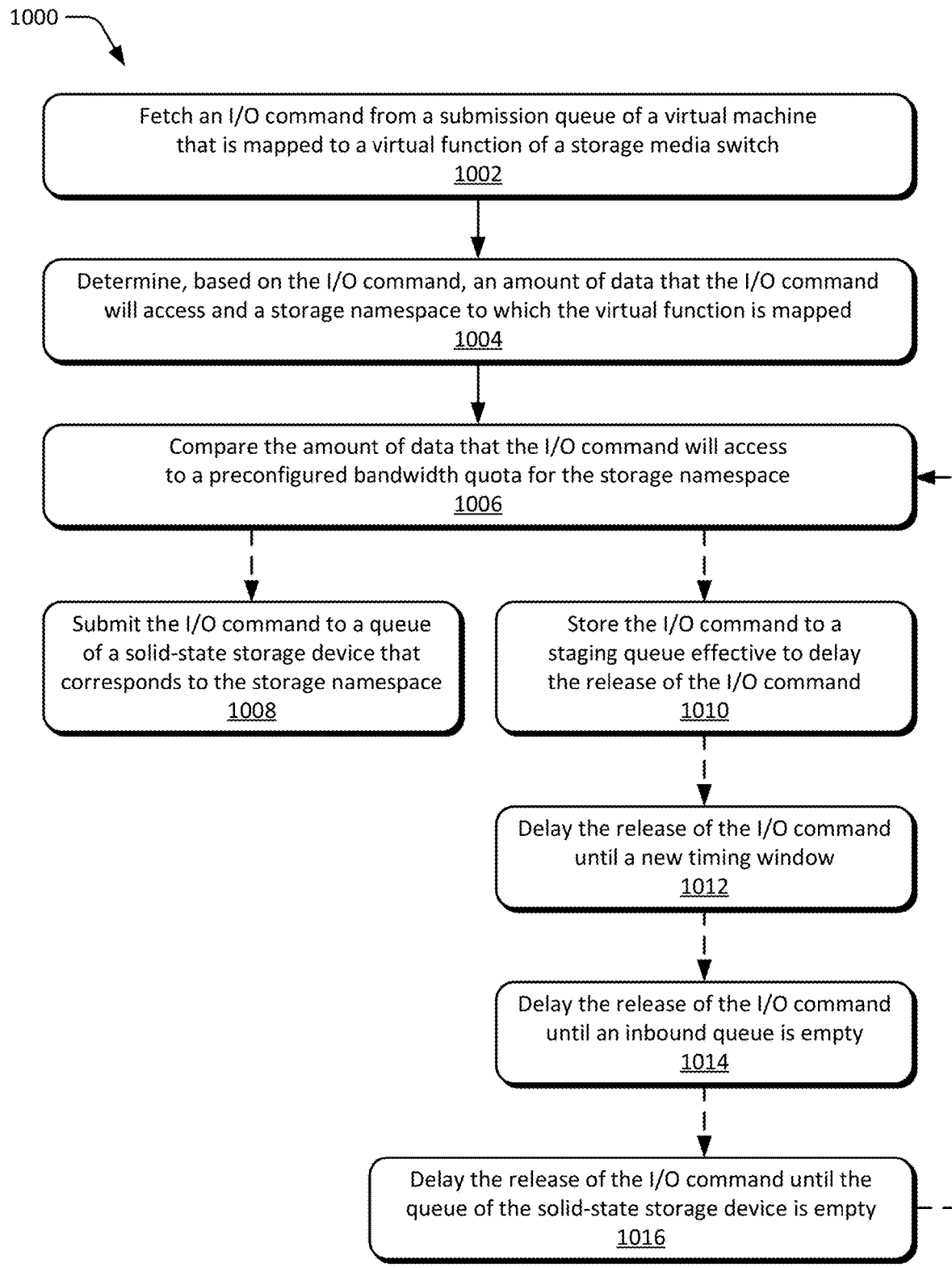
FIG. 10 depicts an example method for submitting I/O commands to a solid-state storage device based on a bandwidth quota for a namespace.

FIG. 10 depicts an example method 1000 for submitting I/O commands to a solid-state storage device based on a bandwidth quota for a namespace. The operations of method 1000 may be performed by or with the storage media switch 122, including the QoS manager 132 or using the QoS parameters 132.

At 1002, a storage media switch fetches an I/O command from a submission queue of a virtual machine that is mapped to a virtual function of the storage media switch. The storage media switch may be an NVMe-based storage media switch that enables mappings between virtual functions and namespaces of solid-state storage operably coupled with the NVMe-based storage media switch. The virtual interface associated with the namespace may include a SR-IOV PCIe interface or a virtual function (VF) provided through a SR-IOV PCIe interface.

At 1004, a QoS manager determines, based on the I/O command, an amount of data that the I/O command will access and a storage namespace to which the virtual function is mapped. The amount of data may be determined based on one of a PRP list of the I/O command, a scatter gather list of the I/O command, a number of I/O operations associated with the I/O command, or an LBA count of the I/O command.

At 1006, the QoS manager compares the amount of data that the I/O command will access to a preconfigured bandwidth quota for the storage namespace. For example, the QoS manager may compare an LBA count to an LBA threshold defined for the namespace over a particular amount of time, such as to implement bandwidth metering.

Optionally at 1008, the QoS manager submits the I/O command to a queue of a solid-state storage device that corresponds to the storage namespace. Alternately at 1010, the QoS manager stores the I/O command to a staging queue effective to delay the release of the I/O command to the solid-state storage.

From operation 1010, the method 1000 may proceed to operation 1012, 1014, and/or operation 1016. At 1012, the QoS manager delays the release of the I/O command until a new timing window. Generally, any I/O commands stored in the staging queue may be reevaluated for submission to a submission queue of one of the storage devices whenever a new timing window starts. At 1014, the QoS manager delays the release of the I/O command until an inbound queue to the QoS manager reaches an empty state. In some cases, the inbound queue reaches an empty state during a current timing window, which indicates that there are no new elements fetched by the inbound engine that need to be evaluated for release. At 1016, the QoS manager delays the release of the I/O command until the queue of the solid-state storage device reaches an empty state. From any of operations, the method 1000 may return to operation 1006 to reevaluate the I/O command for release to the solid-state storage device.

Figure 11:
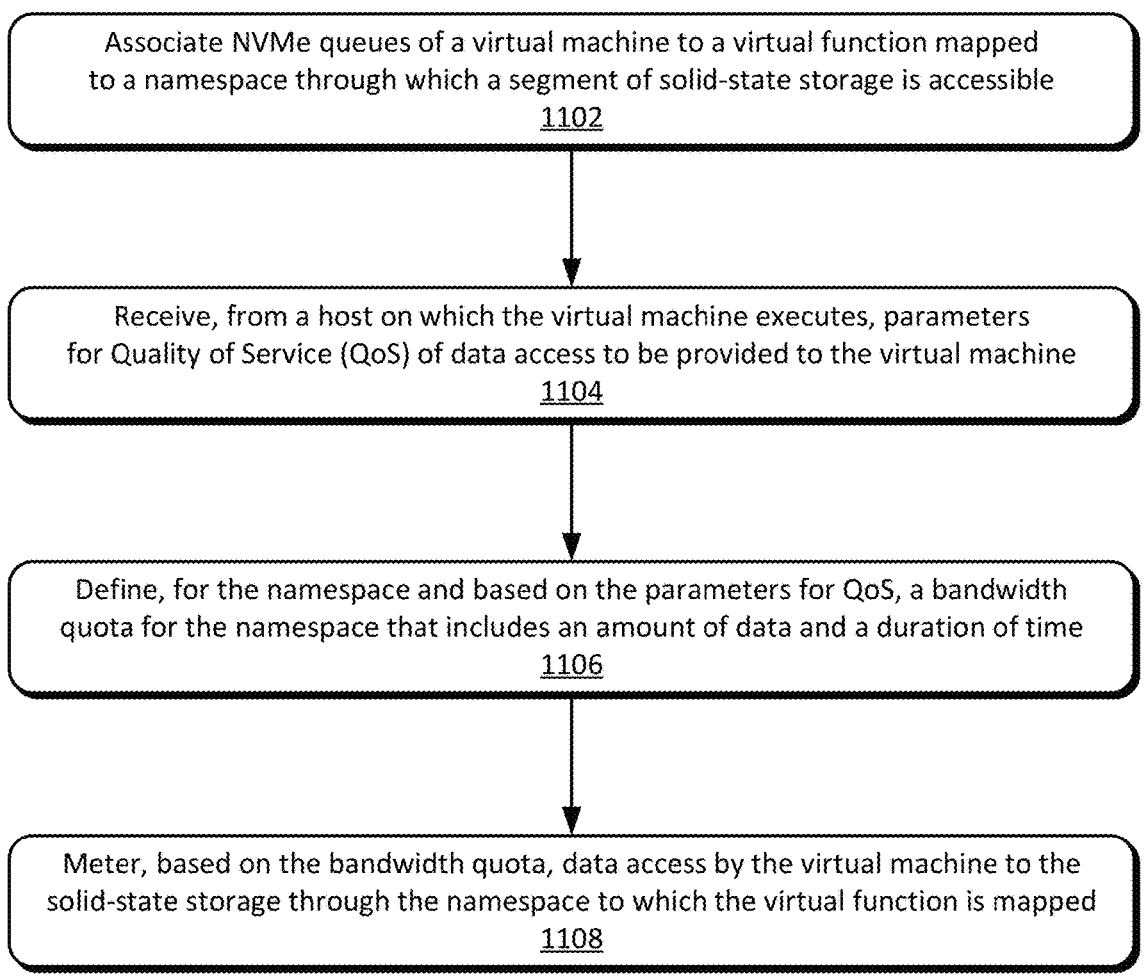
FIG. 11 depicts an example method for managing data access by a virtual machine through a namespace of solid-state storage.

FIG. 11 depicts an example method 1100 for managing data access by a virtual machine through a namespace of solid-state storage. The operations of method 1100 may be performed by or with the host device 102, storage media switch 122, including the QoS manager 132 or using the QoS parameters 132.

At 1102, a host associates NVMe queues of a virtual machine to a virtual function mapped to a namespace through which a segment of solid-state storage is accessible.

At 1104, the QoS manager receives, from the host on which the virtual machine executes, parameters for a QoS of data access to be provided to the virtual machine. In some cases, the QoS manager receives a parameter by which to meter or manage the data access of the solid-state storage through the namespace. In such cases, the QoS manager may determine, based on the parameter, the predefined threshold for data access through the namespace over the duration of time.

At 1106, the QoS defines, for the namespace and based on the parameters for QoS, a bandwidth quota for the namespace that includes an amount of data and a duration of time. At 1108, the QoS manager meters, based on the bandwidth quota, data access by the virtual machine to the solid-state storage through the namespace to which the virtual function is mapped.

System-on-Chip

Figure 12:
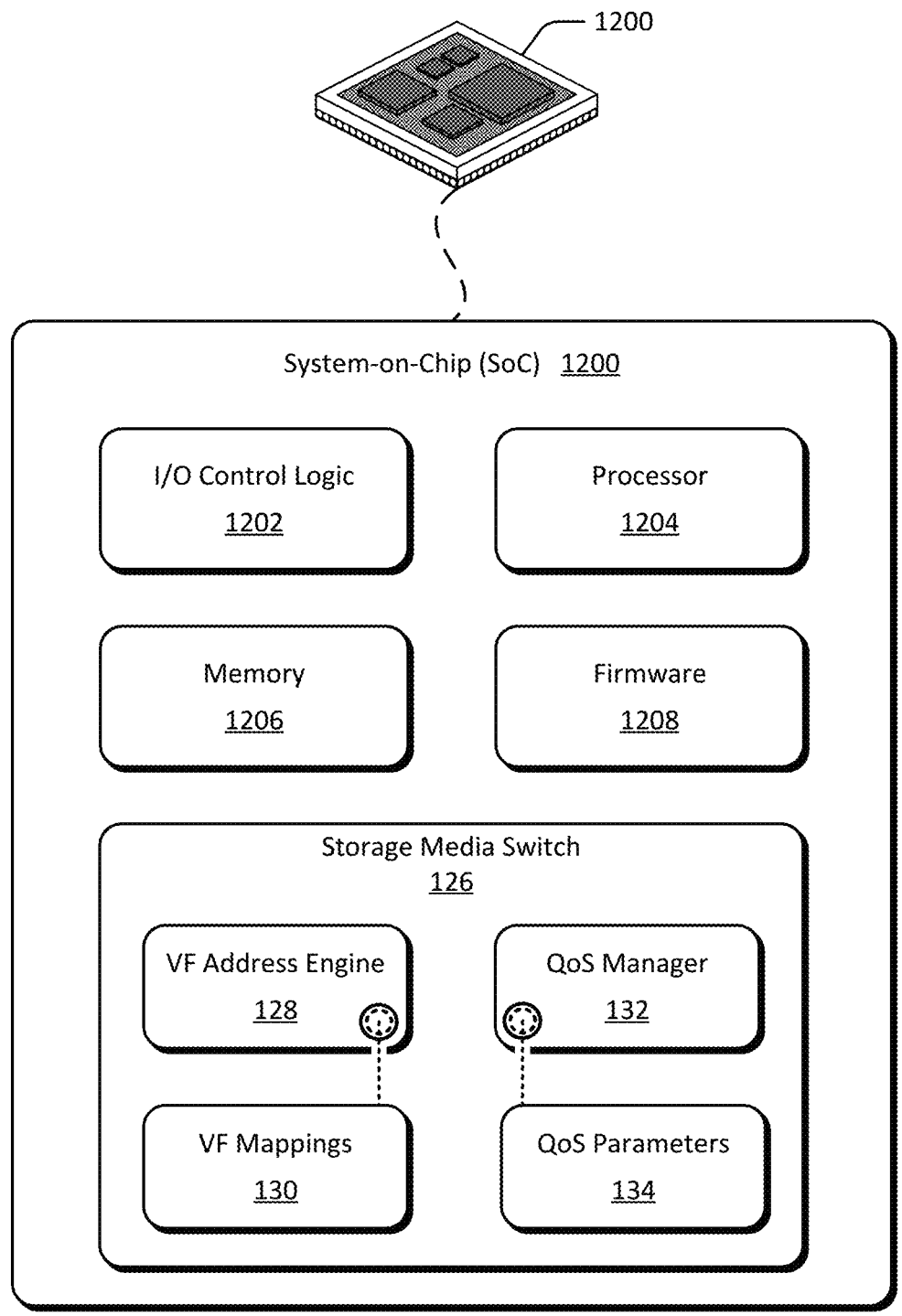
FIG. 12 illustrates an example System-on-Chip (SoC) environment for implementing aspects of enabling virtual functions or QoS over a virtual interface for solid-state storage media.

FIG. 12 illustrates an exemplary System-on-Chip (SoC) 1200 that may implement various aspects of providing QoS over a virtual interface for solid-state media, such as media accessible over an NVMe interface or through a virtual function provided with SR-IOV. The SoC 1200 may be implemented in any suitable device, such as a computing device, host device, storage media switch, network-attached storage, smart appliance, printer, set-top box, server, data center, solid-state drive (SSD), storage drive array, memory module, automotive computing system, server, server blade, storage blade, storage backplane, storage media expansion device, storage media card, storage media adapter, network attached storage, Fabric-enabled storage target, NVMe-based storage controller, or any other suitable type of device (e.g., others described herein). Although described with reference to a SoC, the entities of FIG. 12 may also be implemented as other types of integrated circuits or embedded systems, such as an application-specific integrated-circuit (ASIC), storage controller card, storage backplane, storage controller, communication controller, application-specific standard product (ASSP), digital signal processor (DSP), programmable SoC (PSoC), system-in-package (SiP), or field-programmable gate array (FPGA).

The SoC 1200 may be integrated with electronic circuitry, a microprocessor, memory, input-output (I/O) control logic, communication interfaces, firmware, and/or software useful to provide functionalities of a host device or storage system, such as any of the devices or components described herein (e.g., storage drive or storage array). The SoC 1200 may also include an integrated data bus or interconnect fabric (not shown) that couples the various components of the SoC for data communication or routing between the components. The integrated data bus, interconnect fabric, or other components of the SoC 1200 may be exposed or accessed through an external port, parallel data interface, serial data interface, peripheral component interface, or any other suitable data interface. For example, the components the SoC 1200 may access or control external storage media through an external interface or off-chip data interface.

In this example, the SoC 1200 includes various components such as input-output (I/O) control logic 1202 and a hardware-based processor 1204 (processor 1204), such as a microprocessor, processor core, application processor, DSP, or the like (e.g., processing resource separate from a host x86 processor). The SoC 1200 also includes memory 1206, which may include any type and/or combination of RAM, SRAM, DRAM, non-volatile memory, ROM, one-time programmable (OTP) memory, multiple-time programmable (MTP) memory, Flash memory, and/or other suitable electronic data storage. In some aspects, the processor 1204 and code stored on the memory 1206 are implemented as a storage media switch or switch-enabled storage aggregator to provide various functionalities associated with providing QoS over virtual interfaces for solid-state storage. In the context of this disclosure, the memory 1206 stores data, code, instructions, or other information via non-transitory signals, and does not include carrier waves or transitory signals. Alternately or additionally, SoC 1200 may comprise a data interface (not shown) for accessing additional or expandable off-chip storage media, such as magnetic memory or solid-state memory (e.g., Flash or NAND memory).

The SoC 1200 may also include firmware 1208, applications, programs, software, and/or operating systems, which may be embodied as processor-executable instructions maintained on the memory 1206 for execution by the processor 1204 to implement functionalities of the SoC 1200. The SoC 1200 may also include other communication interfaces, such as a transceiver interface for controlling or communicating with components of a local on-chip (not shown) or off-chip communication transceiver. Alternately or additionally, the transceiver interface may also include or implement a signal interface to communicate radio frequency (RF), intermediate frequency (IF), or baseband frequency signals off-chip to facilitate wired or wireless communication through transceivers, physical layer transceivers (PHYs), or media access controllers (MACs) coupled to the SoC 1200. For example, the SoC 1200 may include a transceiver interface configured to enable storage over a wired or wireless network, such as to provide a network attached storage (NAS) volume with virtualized storage isolation features.

The SoC 1200 also includes an instance of a storage media switch 126 (switch 126) with a VF address engine 128, VF mappings 130, QoS manager 132, and QoS parameters 134, which may be implemented separately as shown or combined with a storage component or data interface. In accordance with various aspects of providing QoS over virtual interfaces for solid-state storage, the switch 126 may meter or allocate bandwidth of a namespace to a tenants or initiators of a host. Alternately or additionally, the VF mappings 130 or QoS parameters 134 may be stored on the memory 1206 of the SoC 1200 or on a memory operably coupled with the SoC 1200 and accessible to the switch 126.

Any of these entities may be embodied as disparate or combined components, as described with reference to various aspects presented herein. Examples of these components and/or entities, or corresponding functionality, are described with reference to the respective components or entities of the environment 100 of FIG. 1 or respective configurations illustrated in FIG. 2, FIG. 3, FIG. 4, and/or FIG. 5. The switch 126, either in whole or part, may be implemented as processor-executable instructions maintained by the memory 1206 and executed by the processor 1204 to implement various aspects and/or features of providing QoS over virtual interfaces for solid-state storage.

The switch 126, VF address engine 128, and/or QoS manager 132, may be implemented independently or in combination with any suitable component or circuitry to implement aspects described herein. For example, the VF address engine 128 and/or QoS manager 132 may be implemented as part of a DSP, processor/storage bridge, I/O bridge, graphics processing unit, memory controller, storage controller, arithmetic logic unit (ALU), or the like. The VF address engine 128 and/or QoS manager 132 may also be provided integrally with other entities of SoC 1200, such as integrated with the processor 1204, memory 1206, a host interface, a storage media interface, or firmware 1208 of the SoC 1200. Alternately or additionally, the switch 126, VF address engine 128, VF mappings 130, QoS manager 132, and/or QoS parameters 134, and/or other components of the SoC 1200 may be implemented as hardware, firmware, fixed logic circuitry, or any combination thereof.

Figure 13:
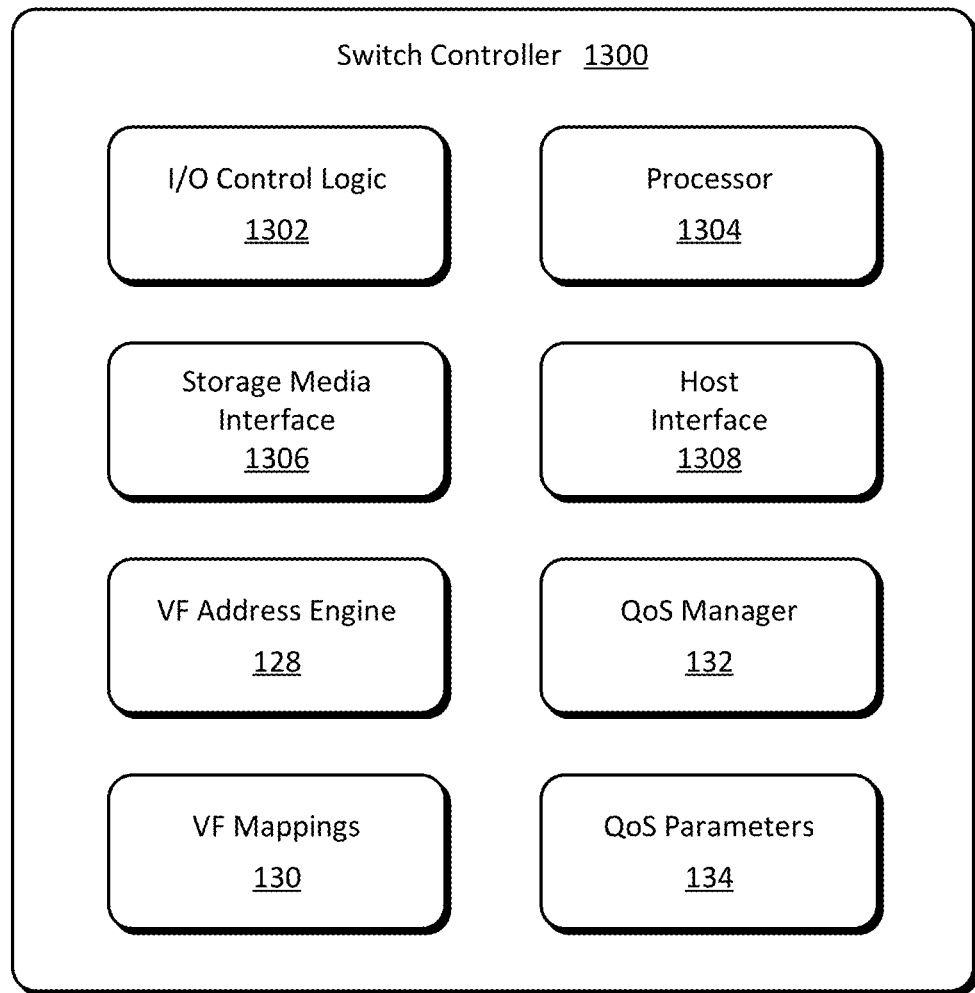
FIG. 13 illustrates an example storage media switch controller that is configured to implement aspects of enabling virtual functions or QoS over a virtual interface for solid-state storage media.

As another example, consider FIG. 13 which illustrates an example storage media switch controller 1300 (switch controller 1300) in accordance with one or more aspects of providing QoS over virtual interfaces for solid-state storage. In various aspects, the switch controller 1300 or any combination of components thereof may be implemented as a storage drive controller, storage media switch, storage media controller, NAS controller, NVMe initiator, NVMe target, or a storage aggregation controller for solid-state storage. In some cases, the switch controller 1300 is implemented similar to or with components of the SoC 1200 as described with reference to FIG. 12. In other words, an instance of the SoC 1200 may be configured as a storage media switch controller, such as the switch controller 1300 to provide and manage QoS over virtual interfaces for solid-state storage.

In this example, the switch controller 1300 includes input-output (I/O) control logic 1302 and a processor 1304, such as a microprocessor, processor core, application processor, DSP, or the like. In some aspects, the processor 1304 and firmware of the storage media switch 1300 may be implemented to provide various functionalities associated with providing QoS over virtual interfaces for solid-state storage, such as those described with reference to methods 600, 700A, 700B, 900, 1000, and/or 1100. The switch controller also includes a storage media interface 1306 and a host interface 1308, which enable access to storage media and host system, respectively. The storage media interface 1306 may include a physical page addressing (PPA) interface, peripheral component interconnect express (PCIe) interface, non-volatile memory express (NVMe) interface, NVM over Fabric (NVM-OF) interface, NVM host controller interface specification (NVMHCIS) compliant interface, or the like. Alternately or additionally, the host interface may include a PCIe interface, SATA-based interface, NVMe interface, NVM-OF interface, NVMHCIS compliant interface, Fabric-enabled storage interface, or the like.

The switch controller 1300 also includes instances of a VF address engine 128, VF mappings 130, QoS manager 132, and QoS parameters 134. Any or all of which may be implemented separately as shown in the switch controller or combined with the processor 1304, storage media interface 1306, host interface 1308, or a flash translation layer (not shown). Examples of these components and/or entities, or corresponding functionality, are described with reference to the respective components or entities of the environment 100 of FIG. 1 or respective configurations illustrated in FIG. 2, FIG. 3, FIG. 4, and/or FIG. 5. The switch controller 1300, either in whole or part, may be implemented as processor-executable instructions maintained by memory (not shown) of the switch and executed by the processor 1304 to implement various aspects and/or features of with providing QoS over virtual interfaces for solid-state storage.

Although the subject matter has been described in language specific to structural features and/or methodological operations, it is to be understood that the subject matter defined in the appended claims is not necessarily limited to the specific examples, features, or operations described herein, including orders in which they are performed.

What is claimed is:

1. A method for enabling Quality of Service (QoS) over a virtual interface for solid-state storage, comprising:

associating, by a storage media switch, an input/output (I/O) command queue of a virtual machine to a virtual function mapped to a namespace through which a segment of solid-state storage media is accessible, the virtual function implemented by the storage media switch;

receiving, from a host on which the virtual machine executes and via a host interface of the storage media switch, a parameter for Quality of Service (QoS) of data access to be provided to the virtual machine;

defining, for the namespace and based on the parameter for QoS, a data access threshold for the namespace that comprises an amount of data and a duration of time over which the amount of data is accessed through the namespace; and managing, based on the data access threshold, data access by the virtual machine to the segment of the solid-state storage media through the namespace to which the virtual function is mapped, the managing of the data access based on the data access threshold comprising:

determining, for an I/O command received through the I/O command queue, an amount of data of the segment of the solid-state storage that the I/O command will access through the namespace;

determining whether the amount of data that the I/O command will access through the namespace exceeds the data access threshold defined for the namespace; and in response to the amount of the data that the I/O command will access not exceeding the data access threshold, releasing the I/O command to the segment of the solid-state storage media via a storage media interface of the storage media switch; or in response to the amount of the data that the I/O command will access exceeding the data access threshold, placing the I/O command in another I/O command queue associated with the virtual function to delay the release of the I/O command.

2. The method as recited in claim 1, wherein:

the host interface to the host comprises a Peripheral Component Interface Express (PCIe) interface over which a non-volatile memory express (NVMe) protocol is implemented; and the I/O command queue or a queue of the media storage switch operably coupled to the I/O command queue comprises an NVMe queue that supports namespace-based access of the solid-state storage media.

3. The method as recited in claim 1, further comprising associating an administrative queue of the virtual machine to the virtual function mapped to the namespace.

4. The method as recited in claim 1, wherein determining the amount of data that the I/O command will access comprises determining the amount of data based on a physical region page (PRP) list of the I/O command, a scatter gather list of the I/O command, a number of I/O operations associated with the I/O command, or a logical block address (LBA) count of the I/O command.

5. The method as recited in claim 1, further comprising, for the I/O command placed in the other I/O command queue:
  waiting until the duration of time of the data access threshold expires;
  determining, for the I/O command, whether the amount of data that the I/O command will access through the namespace exceeds the data access threshold for a subsequent duration of time of the data access threshold; and
  in response to the amount of the data that the I/O command will access not exceeding the data access threshold for the subsequent duration of time, releasing the I/O command to the segment of the solid-state storage media via the storage media interface of the storage media switch.

6. The method as recited in claim 1, wherein the virtual interface associated with the namespace comprises single root I/O virtualization (SR-IOV) peripheral component interconnect express (PCIe) interface or a virtual function (VF) provided through an SR-IOV PCIe interface.

7. The method as recited in claim 1, further comprising:
  mapping, as at least one command queue of a first set of command queues, the I/O command queue of the virtual machine to the virtual function; and
  mapping a second set of command queues of the storage media switch that are associated with the namespace to the virtual function to bind the first set of command queues to the second set of command queues.

8. An apparatus comprising:
  a hardware-based processor;
  a memory coupled to the processor and configured to maintain processor-executable instructions that, responsive to execution, implement a virtual machine of a host on the apparatus;
  a host interface configured to enable the virtual machine to access data in solid-state storage operably coupled to the apparatus; and
  a storage media switch that provides a storage media interface and a Quality of Service (QoS) manager implemented to:
    associate an input/output (I/O) command queue of the virtual machine to a virtual function mapped to a namespace through which a segment of the solid-state storage media is accessible;
    receive, from the host, a parameter for Quality of Service (QoS) of data access to be provided to the virtual machine of the host;
    defining, for the namespace and based on the parameter for QoS, a data access threshold for the namespace that comprises an amount of data and a duration of time over which the amount of data is accessed through the namespace; and
    manage, based on the data access threshold, data access by the virtual machine to the segment of the solid-state storage media through the namespace to which the virtual function is mapped, wherein to manage the data access based on the data access the threshold, the QoS manager is further implemented to:
      determine, for an I/O command received through the I/O command queue, an amount of data of the segment of the solid-state storage that the I/O command will access through the namespace;
      determine whether the amount of data that the I/O command will access through the namespace exceeds the data access threshold defined for the namespace; and
        in response to the amount of the data that the I/O command will access not exceeding the data access threshold, release the I/O command to the segment of the solid-state storage media via a storage media interface of the storage media switch; or
        in response to the amount of the data that the I/O command will access exceeding the data access threshold, place the I/O command in another I/O command queue associated with the virtual function to delay the release of the I/O command.

9. The apparatus as recited in claim 8, wherein:
  the host interface comprises a Peripheral Component Interface Express (PCIe) interface over which a non-volatile memory express (NVMe) protocol is implemented; and
  the I/O command queue comprises an NVMe queue that supports namespace-based access of the solid-state storage media.

10. The apparatus as recited in claim 8, wherein the QoS manager is further implemented to:
  for the I/O command placed in the other I/O command queue, wait until the duration of time of the data access threshold expires;
  determine, for the I/O command, whether the amount of data that the I/O command will access through the namespace exceeds the data access threshold for a subsequent duration of time of the data access threshold; and
  in response to the amount of the data that the I/O command will access not exceed the data access threshold for the subsequent duration of time, release the I/O command to the segment of the solid-state storage media via the storage media interface of the storage media switch.

11. The apparatus as recited in claim 8, wherein the QoS manager is further implemented to determine the amount of data that the I/O command will access based on a physical region page (PRP) list of the I/O command, a scatter gather list of the I/O command, a number of I/O operations associated with the I/O command, or a logical block address (LBA) count of the I/O command.

12. The apparatus as recited in claim 8, wherein the apparatus further comprises the solid-state storage operably coupled to the storage media interface of the storage media switch.

13. The apparatus as recited in claim 8, wherein the QoS manager is further implemented to associate an administrative queue of the virtual machine to the virtual function mapped to the namespace.

14. The apparatus as recited in claim 8, wherein the QoS manager is further implemented to:

map, as at least one command queue of a first set of command queues, the I/O command queue of the virtual machine to the virtual function; and
map a second set of command queues of the storage media switch that are associated with the namespace to the virtual function to bind the first set of command queues to the second set of command queues.

15. A System-on-Chip (SoC) comprising:
a storage media interface configured to enable access to solid-state storage media;
a host interface configured to enable communication with a host device;
hardware-based logic configured to implement a virtual function through which a segment of the solid-state storage media is accessible and a Quality of Service (QoS) manager to:
associate an input/output (I/O) command queue of a virtual machine to the virtual function mapped to a namespace through which the segment of the solid-state storage media is accessible;
receive, from the host on which the virtual machine executes and via the host interface, a parameter for Quality of Service (QoS) of data access to be provided to the virtual machine;
define, for the namespace and based on the parameter for QoS, a data access threshold for the namespace that comprises an amount of data and a timing window through which the amount of data is accessed through the namespace; and
manage, based on the data access threshold, data access by the virtual machine to the segment of the solid-state storage media through the namespace to which the virtual function is mapped, wherein to manage the data access based on the data access threshold, the QoS manager is further implemented to:
determine, for an I/O command received through the I/O command queue, an amount of data of the segment of the solid-state storage that the I/O command will access through the namespace;
determine whether the amount of data that the I/O command will access through the namespace exceeds the data access threshold defined for the namespace; and
in response to the amount of the data that the I/O command will access not exceeding the data access threshold, release the I/O command to the segment of the solid-state storage media via the storage media interface; or
in response to the amount of the data that the I/O command will access exceeding the data access threshold, place the I/O command in another I/O command queue associated with the virtual function to delay the release of the I/O command.

16. The SoC as recited in claim 15, wherein:
the host interface comprises a Peripheral Component Interface Express (PCIe) interface over which a non-volatile memory express (NVMe) protocol is implemented; and
the I/O command queue comprises an NVMe queue that supports namespace-based access of the solid-state storage media.

17. The SoC as recited in claim 15, wherein the QoS manager is further implemented to determine the amount of data that the I/O command will access based on a physical region page (PRP) list of the I/O command, a scatter gather list of the I/O command, a number of I/O operations associated with the I/O command, or a logical block address (LBA) count of the I/O command.

18. The SoC as recited in claim 15, wherein the timing window is a first timing window and the QoS manager is further implemented to:
for the I/O command that is placed in the other I/O command queue, wait until the first timing window expires;
determine whether the amount of data that the I/O command will access through the namespace exceeds the data access threshold for a second timing window of the data access threshold; and
in response to the amount of the data that the I/O command will access not exceed the data access threshold for the second timing window, release the I/O command to the segment of the solid-state storage media via the storage media interface.

19. The SoC as recited in claim 15, wherein the System-on-Chip is embodied on or implemented as part of a host device, a server, a server blade, a storage blade, a storage backplane, a storage media expansion device, a storage media card, a storage media adapter, network-attached storage, a Fabric-enabled storage target, or a storage controller.

20. The SoC as recited in claim 15, wherein the QoS manager is further implemented to associate an administrative queue of the virtual machine to the virtual function mapped to the namespace.

* * * * *